(12) United States Patent
Tsusaka et al.

(10) Patent No.: US 9,623,566 B2
(45) Date of Patent: *Apr. 18, 2017

(54) MASTER APPARATUS FOR MASTER SLAVE APPARATUS, METHOD FOR CONTROLLING THE MASTER APPARATUS, AND THE MASTER SLAVE APPARATUS

(71) Applicant: Panasonic Intellectual Property Management Co., Ltd., Osaka (JP)

(72) Inventors: Yuko Tsusaka, Osaka (JP); Yudai Fudaba, Osaka (JP); Jun Ozawa, Nara (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 229 days.

This patent is subject to a terminal disclaimer.

(21) Appl. No.: 14/532,181

(22) Filed: Nov. 4, 2014

(65) Prior Publication Data

US 2015/0134114 A1    May 14, 2015

(30) Foreign Application Priority Data

Nov. 13, 2013 (JP) ................................. 2013-235305
Jul. 22, 2014 (JP) ................................. 2014-148676

(51) Int. Cl.
*G05B 19/04* (2006.01)
*G05B 19/18* (2006.01)
(Continued)

(52) U.S. Cl.
CPC ............. *B25J 13/085* (2013.01); *B25J 13/02* (2013.01); *B25J 13/04* (2013.01)

(58) Field of Classification Search
CPC ... B25J 13/02; B25J 3/04; B25J 9/1633; B25J 3/00; B25J 13/08; A61B 34/37; A61B 34/77
(Continued)

(56) References Cited

U.S. PATENT DOCUMENTS 6,197,017 B1 * 3/2001 Brock ......................... B25J 3/04
414/5
6,309,397 B1 * 10/2001 Julian .............. A61B 17/00234
128/898
(Continued)

FOREIGN PATENT DOCUMENTS

JP        2012-055752        3/2012

*Primary Examiner* — Harry Oh
(74) *Attorney, Agent, or Firm* — Wenderoth, Lind & Ponack, L.L.P.

(57) ABSTRACT

A master apparatus for a master slave apparatus, the master apparatus controlling a slave apparatus, the master apparatus including a hand operation mechanism configured to be operated by a person for opening and closing a hand mechanism including a pair of opening and closing members, the hand mechanism being connected to a slave mechanism, the slave apparatus including the slave mechanism and the hand mechanism. The hand operation mechanism includes a fixed unit, an opening and closing operation unit, and a slide unit. The opening and closing operation unit is connected to the slide unit, is capable of reciprocating with respect to the fixed unit, and is openable and closable with respect to the fixed unit. The master hand controlling device controls opening and closing of the pair of opening and closing members on the basis of an opening and closing amount of the opening and closing operation unit.

11 Claims, 33 Drawing Sheets

(51) Int. Cl.
*B25J 13/08* (2006.01)
*B25J 13/02* (2006.01)
*B25J 13/04* (2006.01)

(58) Field of Classification Search
USPC .......................................................... 700/257
See application file for complete search history.

(56) References Cited

U.S. PATENT DOCUMENTS

| | | | | |
|---|---|---|---|---|
| 6,436,107 | B1* | 8/2002 | Wang | A61B 34/77 318/568.11 |
| 6,594,552 | B1* | 7/2003 | Gerbi | B25J 9/1689 318/568.11 |
| 6,676,669 | B2* | 1/2004 | Charles | A61B 34/77 606/1 |
| 6,770,081 | B1* | 8/2004 | Cooper | A61B 34/37 606/130 |
| 7,574,250 | B2* | 8/2009 | Niemeyer | A61B 1/00149 318/568.11 |
| 8,394,082 | B2* | 3/2013 | Okamoto | A61B 1/0052 606/1 |
| 8,543,240 | B2* | 9/2013 | Itkowitz | G06F 3/014 414/2 |
| 2005/0251110 | A1* | 11/2005 | Nixon | B25J 9/1692 606/1 |
| 2008/0046122 | A1* | 2/2008 | Manzo | A61B 1/00149 700/245 |
| 2008/0234866 | A1* | 9/2008 | Kishi | B25J 9/1689 700/259 |
| 2009/0132088 | A1* | 5/2009 | Taitler | G05B 19/42 700/264 |
| 2009/0248038 | A1* | 10/2009 | Blumenkranz | B25J 13/085 606/130 |
| 2012/0191245 | A1* | 7/2012 | Fudaba | B25J 9/1633 700/254 |
| 2014/0012286 | A1* | 1/2014 | Lee | A61B 34/37 606/130 |
| 2014/0229007 | A1* | 8/2014 | Kishi | A61B 19/2203 700/257 |

* cited by examiner

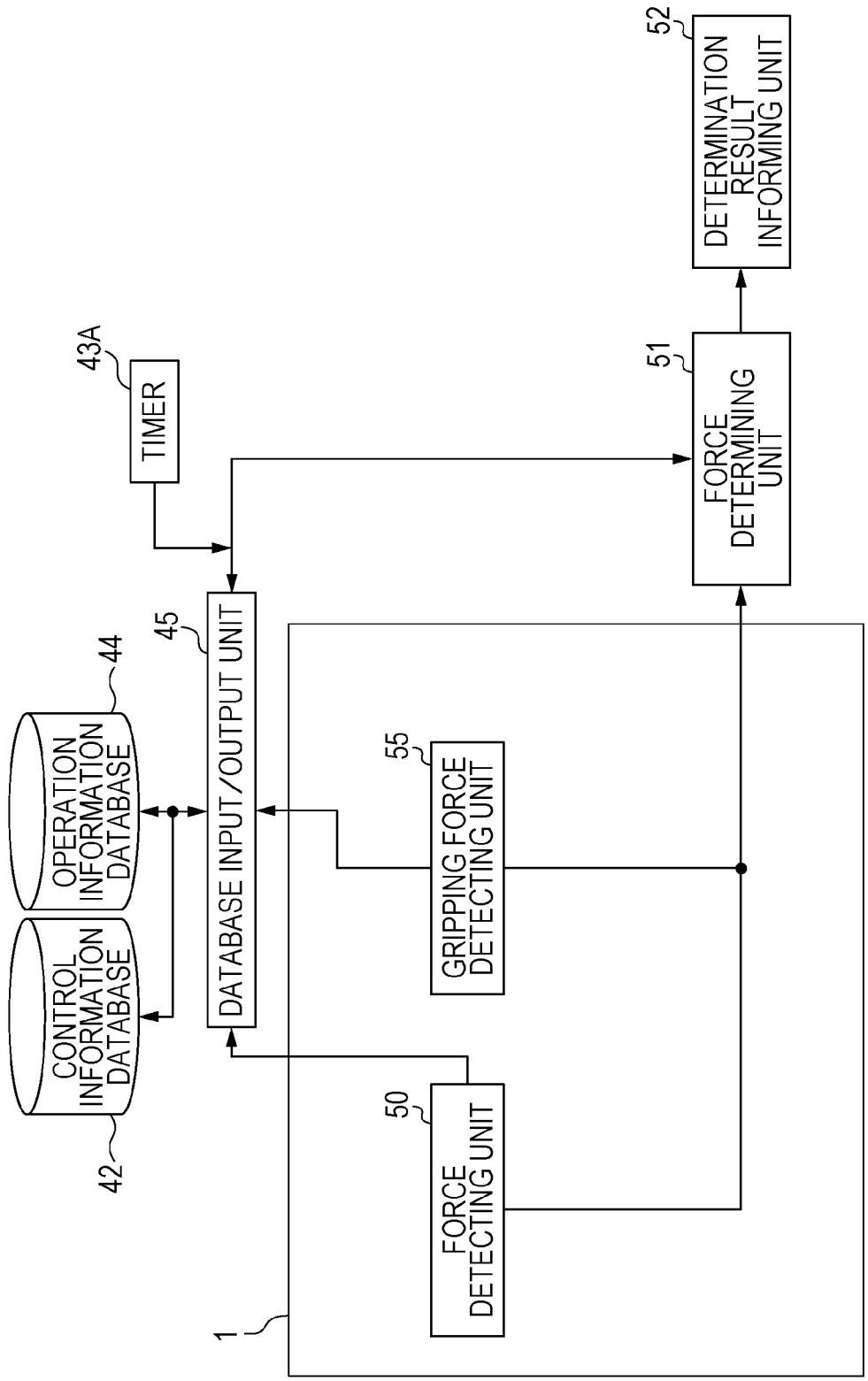

FIG. 13A

| TIME (msec) | FORCE (N, Nm) | GRIPPING FORCE (N) | MASTER POSITION (m) | ANGLE OF OPENING AND CLOSING OPERATION UNIT (rad) | POSITION OF OPENING AND CLOSING OPERATION UNIT (m) | SLAVE POSITION (m) | HAND ANGLE (rad) | FORCE (N, Nm) AFTER GENERATION | GRIPPING FORCE (N) AFTER GENERATION | DETERMINATION RESULT |
|---|---|---|---|---|---|---|---|---|---|---|
| $t_0$ | $fs_0$ | $fh_0$ | $pm_0$ | $rm_0$ | $lm_0$ | $ps_0$ | $rs_0$ | $ff_0$ | $ffh_0$ | 1 |
| $t_1$ | $fs_1$ | $fh_1$ | $pm_1$ | $rm_1$ | $lm_1$ | $ps_1$ | $rs_1$ | $ff_1$ | $ffh_1$ | 0 |
| $\vdots$ | $\vdots$ | $\vdots$ | $\vdots$ | $\vdots$ | $\vdots$ | $\vdots$ | $\vdots$ | $\vdots$ | $\vdots$ | $\vdots$ |
| $t_{10}$ | $fs_{10}$ | $fh_{10}$ | $pm_{10}$ | $rm_{10}$ | $lm_{10}$ | $ps_{10}$ | $rs_{10}$ | $ff_{10}$ | $ffh_{10}$ | 1 |
| $t_{11}$ | $fs_{11}$ | $fh_{11}$ | $pm_{11}$ | $rm_{11}$ | $lm_{11}$ | $ps_{11}$ | $rs_{11}$ | $ff_{11}$ | $ffh_{11}$ | 0 |
| $\cdots$ | $\cdots$ | $\cdots$ | $\cdots$ | $\cdots$ | $\cdots$ | $\cdots$ | $\cdots$ | $\cdots$ | $\cdots$ | $\cdots$ |

FIG. 13B

| CONTROL MODE OF OPENING AND CLOSING OPERATION UNIT | 0 |
|---|---|
| MOVEMENT GAIN | (0.1, 0.1, 0.1, 0.1, 0.1, 0.1) |
| HAND ANGLE GAIN | 0.1 |
| FORCE GAIN | (10, 10, 10, 10, 10, 10,) |
| GRIPPING FORCE GAIN | 10 |

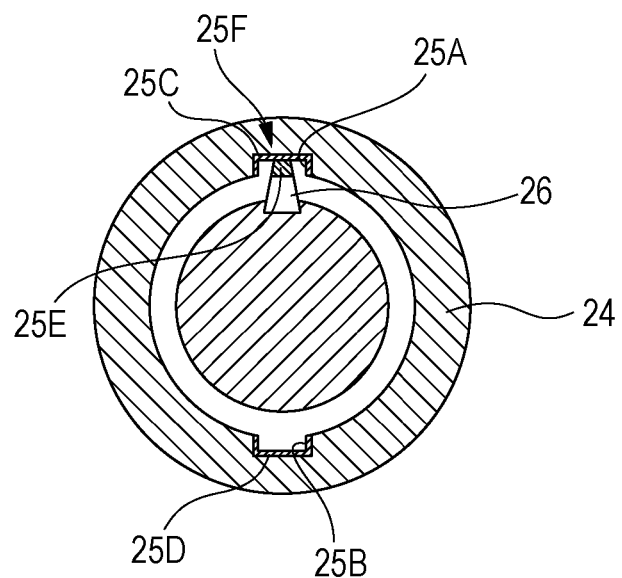
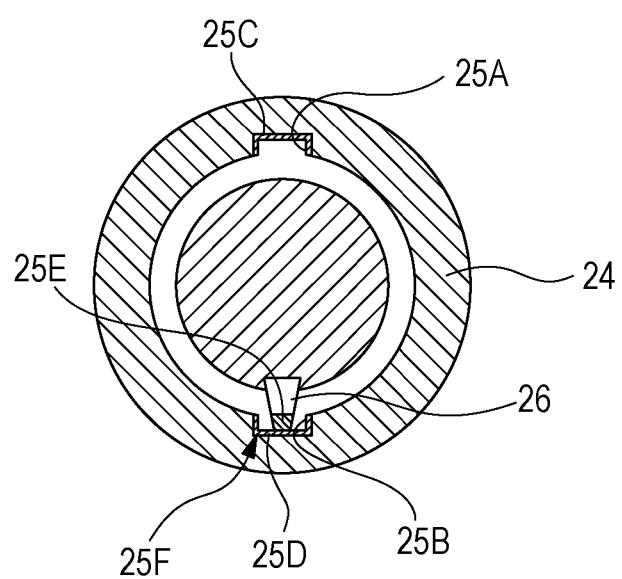

MASTER APPARATUS FOR MASTER SLAVE APPARATUS, METHOD FOR CONTROLLING THE MASTER APPARATUS, AND THE MASTER SLAVE APPARATUS

BACKGROUND

1. Technical Field

The present disclosure relates to, for example, a master apparatus for a master slave apparatus of a master slave robot for generating and outputting an operation of a robot, a method for controlling the master apparatus, and the master slave apparatus.

2. Description of the Related Art

Japanese Unexamined Patent Application Publication (Translation of PCT Application) No. 2012-55752 (PTL 1) discloses a technique in which an operator performs an operation on a patient by controlling a slave arm unit as a result of operating a master robot while the operator confirms an image that is displayed on a screen.

When a person actually grips and operates tweezers, the way the tweezers are operated depends upon a gripping position of the tweezers. For example, when the person grips a location of the tweezers near the tips of the tweezers, the person can perform delicate work while feeling minute changes in gripping force. In contrast, when the person grips a location of the tweezers that is far away from the tips of the tweezers, the person performs work that is less delicate than that performed when the person grips a location of the tweezers at the tips of the tweezers. Therefore, the person does not need to feel very small changes in force.

In PTL 1, it is possible to operate a slave robot by a master robot while confirming an image. However, switching between the ways in which the tweezers are gripped by the master robot and delicate control of the tweezers by the slave robot in accordance with the gripping position are not performed.

One non-limiting and exemplary embodiment provides a master apparatus for a master slave apparatus, which is capable of controlling a gripper or tweezers of a slave apparatus when a person operates the tweezers or the gripper as if the person operates the tweezers or the gripper while directly changing the gripping position of the tweezers or the gripper.

Additional benefits and advantages of the disclosed embodiments will be apparent from the specification and figures. The benefits and/or advantages may be individually provided by the various embodiments and features of the specification and drawings disclosure, and need not all be provided in order to obtain one or more of the same.

SUMMARY

In one general aspect, the techniques disclosed here feature a master apparatus for a master slave apparatus, the master apparatus controlling a slave apparatus. The master apparatus includes a hand operation mechanism configured to perform operating instructions for opening and closing a hand mechanism including a pair of opening and closing members, the hand mechanism being connected to a slave mechanism, the slave apparatus including the slave mechanism and the hand mechanism; a master mechanism configured to operate the slave mechanism; a master hand controlling device; and an output unit. The hand operation mechanism includes a fixed unit, an opening and closing operation unit, and a slide unit. The slide unit is attached so as to be capable of reciprocating with respect to the fixed unit. The opening and closing operation unit is connected to the slide unit, is capable of reciprocating with respect to the fixed unit, and is openable and closable with respect to the fixed unit. The master hand controlling device controls opening and closing of the pair of opening and closing members on the basis of an opening and closing amount of the opening and closing operation unit. The output unit outputs operation information to the slave mechanism on the basis of the opening and closing amount and a position of the opening and closing operation unit at the fixed unit, the operation information including an angle of the pair of opening and closing members.

All-embracing and specific forms thereof may be realized by a system, a method, or a computer program and by any combination of the system, the method, and the computer program.

According to the master apparatus for the master slave apparatus of the present disclosure, when, as an example of a hand mechanism, tweezers or a gripper is mounted on the slave mechanism, it becomes possible to control the gripper or the tweezers mounted on the slave mechanism when the gripper or the tweezers are operated while changing the gripping position or the supporting position of the tweezers or the gripper.

BRIEF DESCRIPTION OF THE DRAWINGS

FIG. 10 is a block diagram of a detailed structure of a force measuring device in the first embodiment of the present disclosure.

FIG. 13A illustrates an operation information database in the first embodiment of the present disclosure.

FIG. 13B illustrates a control information database in the first embodiment of the present disclosure.

FIG. 20B is a sectional view of a rotating mechanism in the second embodiment.

FIG. 20C is a sectional view of the rotating mechanism in the second embodiment.

DETAILED DESCRIPTION

Figure 1:
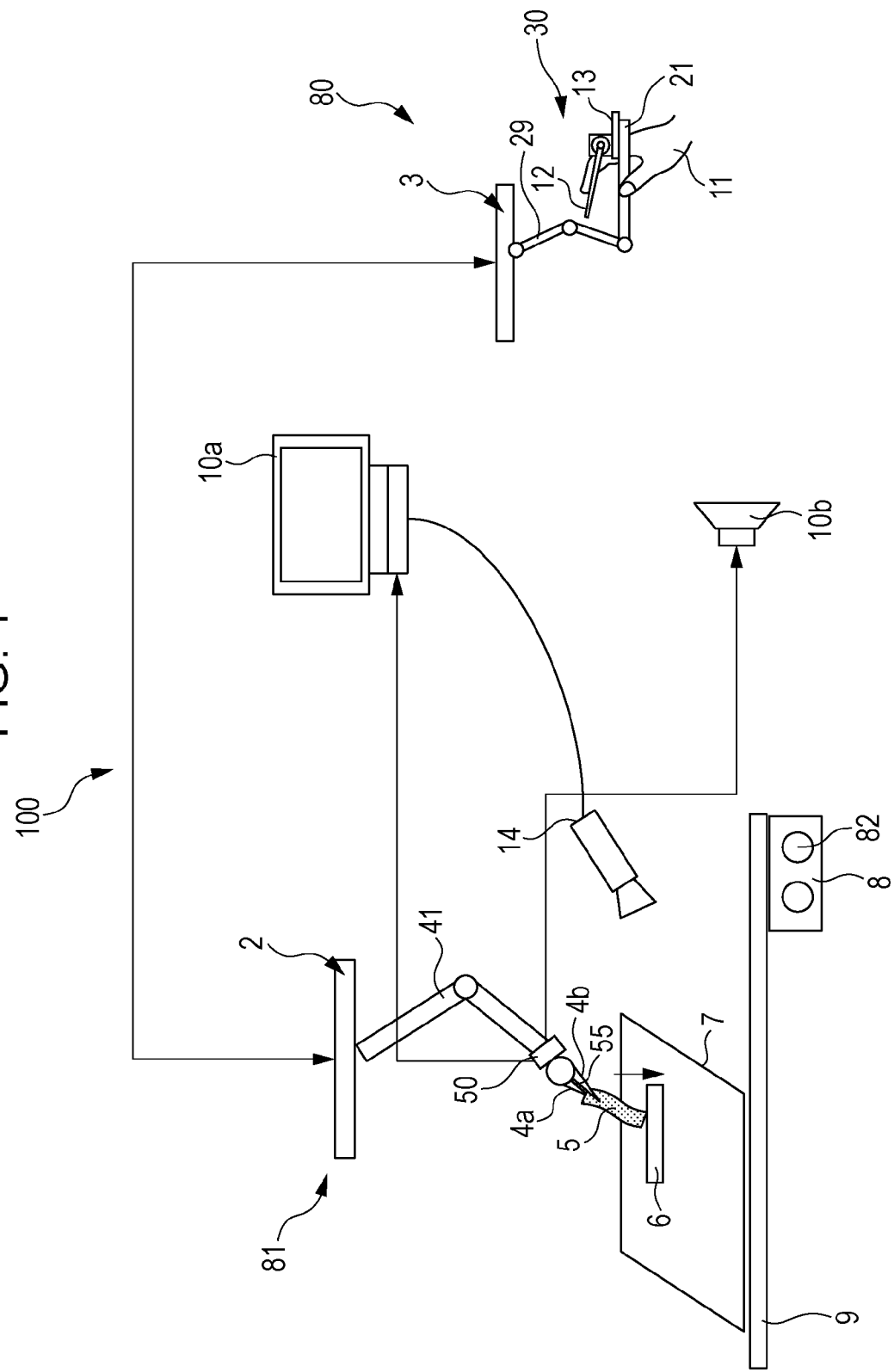
FIG. 1 is a schematic explanatory view of a structure of a master slave apparatus according to a first embodiment of the present disclosure.

Embodiments of the present disclosure are hereunder described with reference to the drawings.

Prior to describing in detail the embodiments of the present disclosure with reference to the drawings, various aspects of the present disclosure are described.

According to a first aspect of the present disclosure, there is provided a master apparatus for a master slave apparatus, the master apparatus controlling a slave apparatus. The master apparatus includes a hand operation mechanism configured to perform operating instructions for opening and closing a hand mechanism including a pair of opening and closing members, the hand mechanism being connected to a slave mechanism, the slave apparatus including the slave mechanism and the hand mechanism; a master mechanism configured to operate the slave mechanism; a master hand controlling device; and an output unit. The hand operation mechanism includes a fixed unit, an opening and closing operation unit, and a slide unit. The slide unit is attached so as to be capable of reciprocating with respect to the fixed unit. The opening and closing operation unit is connected to the slide unit, is capable of reciprocating with respect to the fixed unit, and is openable and closable with respect to the fixed unit. The master hand controlling device controls opening and closing of the pair of opening and closing members on the basis of an opening and closing amount of the opening and closing operation unit. The output unit outputs operation information to the slave mechanism on the basis of the opening and closing amount and a position of the opening and closing operation unit at the fixed unit, the operation information including an angle of the pair of opening and closing members.

By virtue of this structure, if, as an example of the hand mechanism, tweezers or a gripper is mounted on the slave mechanism, it becomes possible to control the gripper or the tweezers mounted on the slave mechanism when the tweezers or the gripper is operated while changing the gripping position or the supporting position of the tweezers or the gripper.

According to a second aspect of the present disclosure, there is provided the master apparatus for the master slave apparatus according to first aspect, wherein the opening and closing operation unit is operable with a thumb or an index finger of a person, and wherein, when the opening and closing operation unit is being operated, the fixed unit is supportable with a finger other than the finger of the person that operates the opening and closing operation unit.

By virtue of this structure, if, as an example of the hand mechanism, tweezers or a gripper is mounted on the slave mechanism, it becomes possible to open and close the tweezers or the gripper mounted on the slave mechanism while changing the gripping position or the supporting position of the tweezers or the gripper.

According to a third aspect of the present disclosure, there is provided the master apparatus for the master slave apparatus according to the second aspect, wherein the slide unit is connected to a side surface of the fixed unit, and wherein the master apparatus further includes an opening-and-closing-operation-unit position acquiring unit and an opening-and-closing amount acquiring unit, the opening-and-closing-operation-unit position acquiring unit being configured to acquire a position of the opening and closing operation unit with respect to the fixed unit at the master mechanism as the position of the opening and closing operation unit with respect to the slide unit, the opening and closing amount acquiring unit being configured to acquire the opening and closing amount at the opening and closing operation unit.

By virtue of this structure, it is possible to finely adjust the angle of the hand mechanism in accordance with the position of the opening and closing operation unit.

According to a fourth aspect of the present disclosure, there is provided the master apparatus for the master slave apparatus according to the second aspect, wherein the slide unit is connected to the fixed unit, wherein the master apparatus further includes an opening-and-closing-operation-unit position acquiring unit and an opening-and-closing amount acquiring unit, wherein the opening-and-closing-operation-unit position acquiring unit is configured to acquire a position of the opening and closing operation unit with respect to the fixed unit at the master mechanism as the position of the opening and closing operation unit with respect to the slide unit, wherein the opening and closing amount acquiring unit is configured to acquire the opening and closing amount, wherein the slave apparatus includes a force information acquiring unit and a gripping force information acquiring unit, wherein the force information acquiring unit is configured to acquire force information about a force that is applied to the slave mechanism from outside, wherein the gripping force information acquiring unit is configured to acquire gripping force information about a gripping force generated when an object is gripped by opening and closing the hand mechanism, wherein the master hand controlling device includes an operation information generating unit and a master hand controlling unit, wherein the operation information generating unit is configured to provide generated gripping force information or generated force information for operation information in accordance with the position of the opening and closing operation unit with respect to the slide unit and the force information acquired by the force information acquiring unit or the gripping force information acquired by the gripping force information acquiring unit, wherein the master hand controlling unit transmits, as the operation information, the generated force information or the generated gripping force information provided by the operation information generating unit to the master mechanism, wherein the slave apparatus further includes a slave hand controlling unit, wherein the slave hand controlling unit is connected to the slave mechanism and the master hand controlling unit, and wherein the slave hand controlling unit outputs, as operation information that is transmitted to the slave mechanism, the operation information of the master mechanism that is transmitted from the master hand controlling unit.

According to this structure, in accordance with the position of the opening and closing operation unit with respect to the slide unit and the force information acquired by the force information acquiring unit or the gripping force information acquired by the gripping force information acquiring unit, with feedback from the master mechanism to a hand of a person being made possible, it is possible for the person to sense a force like that which is felt when the gripping position of the tweezers or the gripper is changed.

According to a fifth aspect of the present disclosure, there is provided the master apparatus for the master slave apparatus according to the fourth aspect, wherein a member that is connected to the opening and closing operation unit is disposed so as to protrude in a direction that crosses the fixed unit.

According to this structure, by contacting and supporting the member that is connected to the opening and closing operation unit with the back of the hand, it is possible to prevent the master mechanism from undergoing unintentional rotation when the opening and closing operation unit is operated.

According to a sixth aspect of the present disclosure, there is provided the master apparatus for the master slave apparatus according to the fifth aspect, further including a control information setting unit configured to switch control modes between a reset mode and a movement mode, the reset mode being the control mode in which a control operation is temporarily stopped for resetting a position of the master mechanism or the position of the opening and closing operation unit with respect to the slide unit, the movement mode being the control mode in which the operation is performed by the hand mechanism, wherein, on the basis of the control mode that has been set by the control information setting unit, the master hand controlling device outputs operation information for controlling the slave mechanism.

According to this structure, the control information setting unit that switches control modes between the reset mode in which the control operation is temporarily stopped for resetting the position of the master mechanism and the movement mode in which the above-described operation is performed by the hand mechanism can temporarily stop the control operation due to the reset mode. Therefore, the operator can move the opening and closing operation unit to a position where the opening and closing operation unit is easily used. In addition, by setting the movement mode, it is possible to switch to a mode in which the position of the hand mechanism is finely adjusted.

According to a seventh aspect of the present disclosure, there is provided the master apparatus for the master slave apparatus according to the fourth aspect, wherein the operation information generating unit generates the generated force information or the generated gripping force information so as to increase in value as the position of the opening and closing operation unit with respect to the slide unit moves towards a back side with respect to the slide unit, and provides the generated force information or the generated gripping force information so as to decrease in value as the position of the opening and closing operation unit with respect to the slide unit moves towards a front side with respect to the slide unit.

By virtue of this structure, by increasing the force that is fed back to the master mechanism as the position of the opening and closing operation unit is moved towards the back with respect to the slide unit, it is possible to provide a sensation like that which is provided when the tips of tweezers are directly gripped. In addition, by virtue of this structure, by reducing the force that is fed back to the master mechanism as the position of the opening and closing operation unit is moved towards the front with respect to the slide unit, it is possible to provide a sensation like that which is provided when a back side of the tweezers is gripped.

According to an eighth aspect of the present disclosure, there is provided the master apparatus for the master slave apparatus according to the seventh aspect, further including a rotating mechanism that is connected to the slide unit and the opening and closing operation unit and that is rotatable with respect to the fixed unit around the fixed unit, wherein, by rotating the rotating mechanism with respect to the fixed unit, a change is capable of being made between a position where the opening and closing operation unit is disposed at an upper side of the fixed unit and a position where the opening and closing operation unit is disposed at a lower side of the fixed unit.

By virtue of this structure, it is possible to switch between the operation of the opening and closing operation unit of the hand operation mechanism with the index finger and the operation of the opening and closing unit of the hand operation mechanism with the thumb.

According to a ninth aspect of the present disclosure, there is provided the master apparatus for the master slave apparatus according to the eighth aspect, further including a rotating mechanism position detecting unit configured to detect whether the opening and closing operation unit is disposed at the upper side of the fixed unit or is disposed at the lower side of the fixed unit, and to output a result of the detection to the operation information generating unit, wherein, when the movement mode for performing the operation at the hand mechanism is set and the rotating mechanism position detecting unit detects that the opening and closing operation unit is disposed at the lower side of the fixed unit, the operation information generating unit sets the reset mode.

By virtue of this structure, since, when the opening and closing operation unit is disposed at the lower side of the fixed unit and is operated with the thumb, a movement range is reduced and the operation becomes difficult to perform, the control mode is automatically changed to the reset mode to make it possible to temporarily not allow the operation.

According to a tenth aspect of the present disclosure, there is provided a master slave apparatus including the master apparatus for the master slave apparatus according to the first aspect; the hand mechanism; and the slave mechanism.

According to an eleventh aspect of the present disclosure, there is provided a method for controlling a master apparatus for a master slave apparatus, the master apparatus controlling a slave apparatus. The method includes the steps of causing a hand operation mechanism to perform operating instructions for opening and closing a hand mechanism, the hand operation mechanism including a fixed unit, an opening and closing operation unit, and a slide unit, the hand mechanism including a pair of opening and closing members, the slide unit being attached so as to be capable of reciprocating with respect to the fixed unit, the opening and closing operation unit being connected to the slide unit, being capable of reciprocating with respect to the fixed unit, and being openable and closable with respect to the fixed unit, the hand mechanism being connected to a slave mechanism, the slave apparatus including the slave mechanism and the hand mechanism; causing the master mechanism to operate the slave mechanism; causing a master hand controlling device to control opening and closing of the pair of opening and closing members on the basis of an opening and closing amount of the opening and closing operation unit; and causing an output unit to output operation information to the slave mechanism on the basis of the opening and closing amount and a position of the opening and closing operation unit at the fixed unit, the operation information including an angle of the pair of opening and closing members.

By virtue of this structure, when, as an example of the hand mechanism, tweezers or a gripper is mounted on the slave mechanism, it becomes possible to control the gripper or the tweezers mounted on the slave mechanism when the gripper or the tweezers are operated while changing the gripping position or the supporting position of the tweezers or the gripper.

First Embodiment

A general description of a master slave apparatus 100 including a master apparatus 80 for the master slave apparatus according to a first embodiment of the present disclosure is given.

Figure 9A:
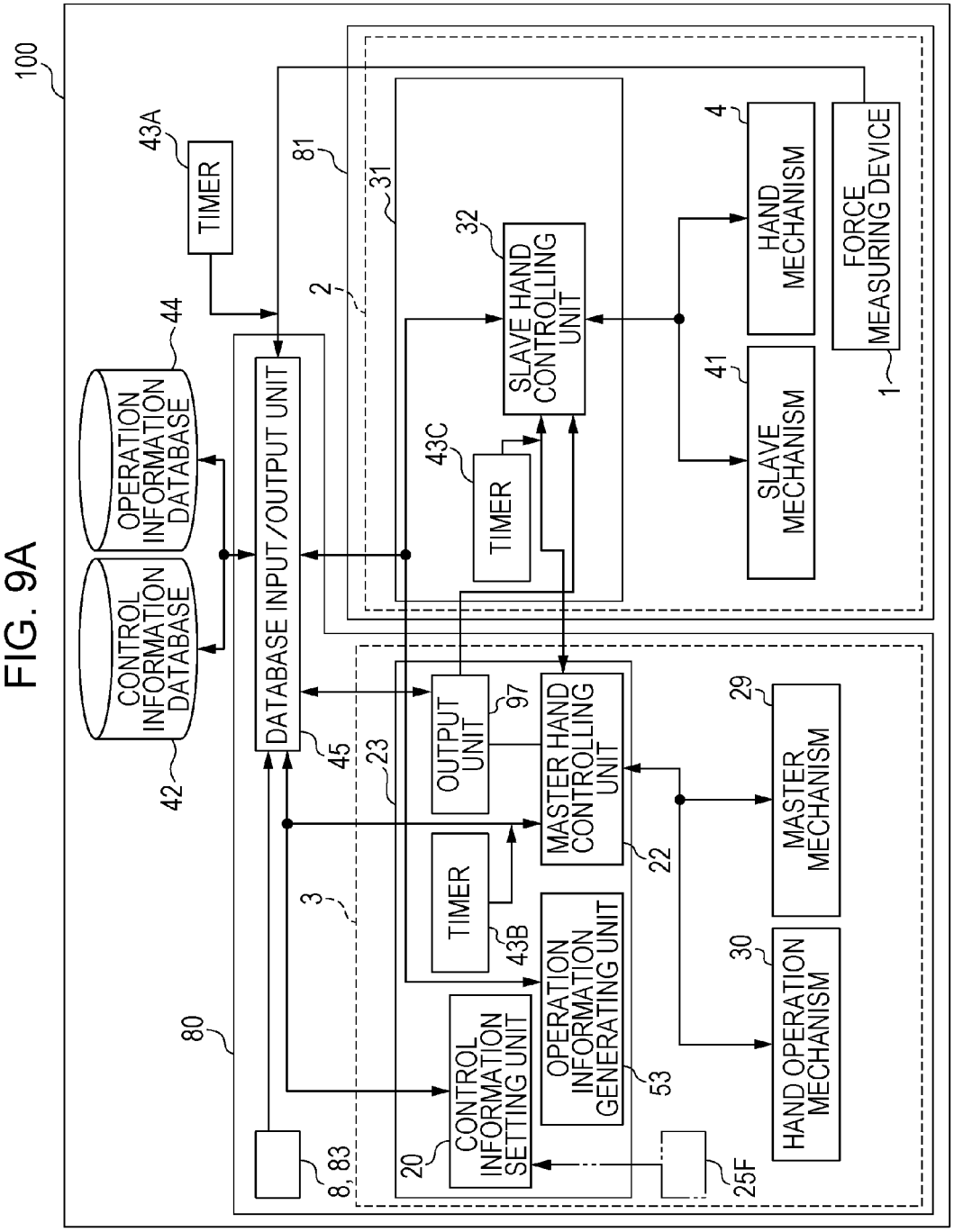
FIG. 9A is a block diagram of a detailed structure of the master slave apparatus in the first embodiment of the present disclosure.

FIG. 1 illustrates, as an example of an operation using the master slave apparatus 100, an insertion operation for inserting a part. FIG. 9A is a block diagram of a detailed structure of the master slave apparatus in the first embodiment.

As illustrated in FIG. 1, an operation for mounting a part (exemplary object) 5 on an insertion opening (exemplary target object) 6 of a printed circuit board for a device, such as a television, a DVD recorder, or a cellular phone, in, for example, cell production in a plant is used as an example for describing the first embodiment.

Master Slave Apparatus 100, Master Apparatus 80, and Slave Apparatus 81

The master slave apparatus 100 includes a slave apparatus 81 and the master apparatus 80.

The slave apparatus 81 includes at least a slave mechanism 41 and a hand mechanism 4 provided at the slave mechanism 41. The slave apparatus 81 further includes a slave hand controlling device 31 and a force measuring device 1. In the specification, the phrase "hand mechanism connected to the slave mechanism" may be expressed as "hand mechanism provided at the slave mechanism."

The master apparatus 80 includes at least a master mechanism 29 and a hand operation mechanism 30 provided at the master mechanism 29. The master apparatus 80 further includes a database input/output unit 45 and a master hand controlling device 23. In the specification, the phrase "hand operation mechanism connected to the master mechanism" may be expressed as "hand operation mechanism provided at the master mechanism."

According to the master slave apparatus 100, at the master apparatus 80, a person (such as an operator 11) who is situated away from the slave apparatus 81 operates the hand operation mechanism 30 provided at the master mechanism 29 of the master apparatus 80 by remote control. As a result, operation information (generated information described below) is output to the slave apparatus 81 from the master apparatus 80 to cause the hand mechanism 4 provided at the slave mechanism 41 to operate to grip the object 5, and perform an operation on the target object 6. Although, in the specification, the operation for causing the hand mechanism 4 to grip the object 5 and to perform a task on the target object 6 is described as one example, the present disclosure is not limited to this operation. For example, the present disclosure is applicable to a predetermined operation (such as cutting or widening the object 5) by mounting on the slave mechanism 41 a tool for performing the predetermined operation instead of the hand mechanism 4 for performing a gripping operation.

More specifically, it is possible to cause a slave robot 2 to be operated when the master slave apparatus 100 is provided with at least a master robot 3, the slave robot 2, the database input/output unit 45 (described below), and the force measuring device 1, and when the operator 11 remotely operates the master robot 3 on the basis of, for example, an input from the database input/output unit 45. Further, if necessary, as illustrated in FIG. 10, the master slave apparatus 100 includes a control information database 42 and an operation information database 44 connected to the database input/output unit 45.

One example of the master robot 3 includes the master mechanism 29, the hand operation mechanism 30, and the master hand controlling device 23. The master mechanism 29 includes a robot arm as an example. The operator 11 directly contacts and inputs a master operation to the master mechanism 29. The hand operation mechanism 30 is provided at an end portion of the master mechanism 29 and operates the hand mechanism 4.

Although described in detail below, on the basis of operation information acquired by the hand operation mechanism 30 (that is, the position or the angle of the opening and closing operation unit 12 with respect to the slide unit 13), an output unit 97 of the master hand controlling device 23 outputs operation information for operating the hand mechanism 4 (that is, generated information described below) to the slave mechanism 41 via a slave hand controlling unit 32 of the slave hand controlling device 31 (described below).

The slave robot 2 is a robot system that is disposed separately from the master robot 3, includes at least the slave mechanism 41 and the hand mechanism 4, and actually performs a predetermined operation. The slave mechanism 41 includes a robot arm as one example and performs a slave operation. The hand mechanism 4 is provided at an end portion of the slave mechanism 41 and grips and ungrips the object 5 by an opening and closing operation of the hand mechanism 4. The slave robot 2 further includes the slave hand controlling device 31. The slave hand controlling device 31 receives the operation information for operating the hand mechanism 4 (that is, the generated information described below) from (the output unit 97 of) the master hand controlling device 23, and separately performs operation control on the slave mechanism 41 and the hand mechanism 4.

One example of the slave robot 2 of the master slave apparatus 100 is a robot that is disposed at a wall surface or an upper side of a work table 9 where a device 7 is placed, and that performs an operation for inserting the part 5 into the insertion opening 6 of the device 7.

A side surface of the work table 9 is provided with an input IF 8, such as an operating panel where, for example, buttons are disposed. The input IF 8 functions as one example of a user input/output unit 83 (see FIG. 9A). A reset button 82 (described below) also serves as one example of the user input/output unit 83. Input information is stored in, for example, the control information database 42.

Hand Mechanism 4

The hand mechanism 4 that grips the part 5 is mounted on an end portion of the slave robot 2. The hand mechanism 4 includes a hand, such as tweezers (or a gripper). The tweezers include a pair of opening and closing members 4a and 4b that are openable and closable around a rotation fulcrum provided at a back end of the tweezers (see FIG. 4A). It is assumed that the object 5 is capable of being gripped at the tips of the pair of opening and closing members 4a and 4b. That is, it is possible to grip the object 5 by closing the tips of the pair of opening and closing members 4a and 4b; and to ungrip the object 5 by opening the tips of the pair of opening and closing members 4a and 4b.

Hand Operation Mechanism 30

Figure 2A:
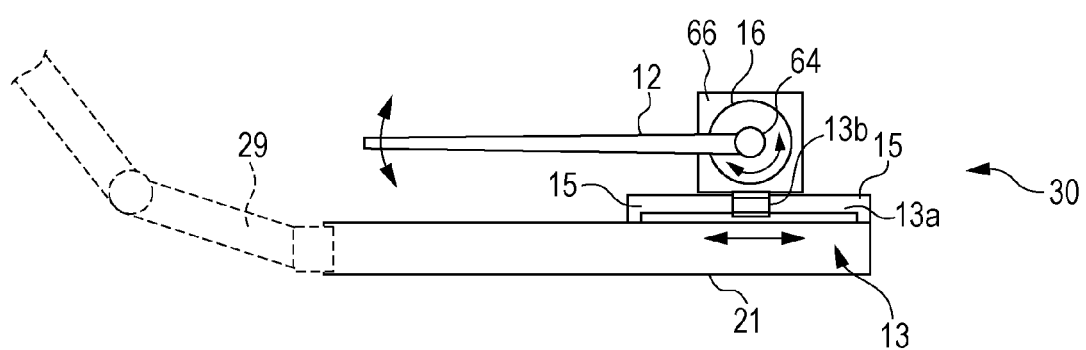
FIG. 2A is a schematic top plan view of a hand operation mechanism at a master side in the first embodiment.
Figure 2B:
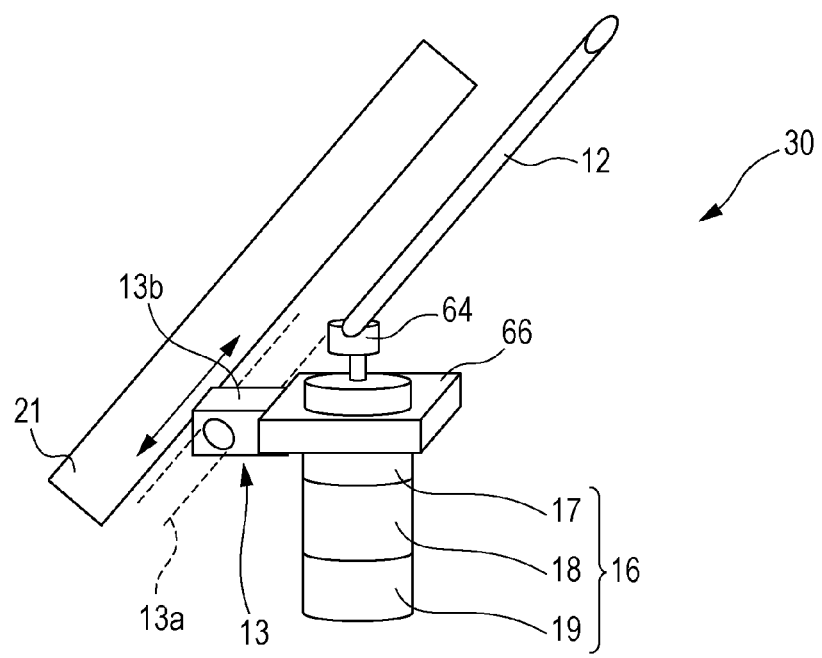
FIG. 2B is a schematic oblique transverse perspective view of the hand operation mechanism in the first embodiment.

The hand operation mechanism 30 is a mechanism that operates the hand mechanism. As schematically illustrated in FIGS. 2A and 2B, the hand operation mechanism 30 includes the rod-like (lever-like) opening and closing operation unit 12, a rod-like grip unit 21, and a slide unit (hand supporting unit) 13. The operator 11 opens and closes the opening and closing operation unit 12. The grip unit 21 is connected to the opening and closing operation unit 12 and is gripped by the operator 11 when the operator 11 opens and closes the opening and closing operation unit 12. The grip unit 21 functions as one example of a fixed unit. The slide unit 13 is connected at a location between the grip unit 21 and the opening and closing operation unit 12. The slide unit 13 is where the opening and closing operation unit 12 is capable of advancing and retreating (reciprocating) along a longitudinal direction of the grip unit 21 with respect to the grip unit 21. The operator 11 opens and closes the opening and closing members 4a and 4b of a hand, such as tweezers, of the hand mechanism 4. By gripping the grip unit 21 with, for example, a finger of the hand (such as a thumb 11a) and a back 11f of the hand or a finger other than a finger (such as the thumb 11a or an index finger 11b) that operates the opening and closing operation unit 12, the operator 11 is capable of separately performing the opening and closing operation of the opening and closing operation unit 12 and a sliding operation of the opening and closing operation unit 12 with respect to the slide unit 13 using different fingers (such as the index finger 11b and a middle finger 11c) (see FIGS. 3A and 3B described below).

The slide unit 13 is connected to the grip unit 21 connected to an end of the master mechanism 29. The slide unit 13 includes a linear slide rail 13a and an operating-unit supporting section 13b. The slide rail 13a is fixed to the grip unit 21 along a longitudinal direction of the grip unit 21. The operating-unit supporting section 13b engages with the slide rail 13a and is manually slid along the slide rail 13a. The opening and closing operation unit 12 is disposed at the operating-unit supporting section 13b so as to be rotatable around a rotation fulcrum.

The grip unit 21 is disposed by fixedly connecting one end of the grip unit 21 to an end portion of the robot arm serving as an example of the master mechanism 29. Therefore, if the grip unit 21 is operated so as to move in, for example, an up-down direction, a left-right direction, or a front-back direction, the robot arm is moved in, for example, the up-down direction, the left-right direction, or the front-back direction.

The opening and closing operation unit 12 is caused to be openably and closably rotatable within a predetermined angle range with a finger of the operator 11. For example, when the index finger 11b of the operator 11 contacts the opening and closing operation unit 12 and rotates the opening and closing operation unit 12 around the rotation fulcrum, the pair of opening and closing members 4a and 4b of the tweezers can be opened and closed. Even if the opening and closing operation unit 12 is in an opened state or a closed state, the operating-unit supporting section 13b can be advanced or retreated (reciprocated) along the slide rail 13a. Therefore, at the pair of opening and closing members 4a and 4b of the tweezers, when, as mentioned below, a control mode is switched to a movement mode, a gripping position where pressure is applied to the tweezers can be moved between a front end side and a back end side of the tweezers, or the tweezers themselves can be moved by only a very small amount.

Specific examples of the hand operation mechanism 30 and the hand mechanism 4 are described below with reference to FIGS. 2A to 4B.

Figure 2C:
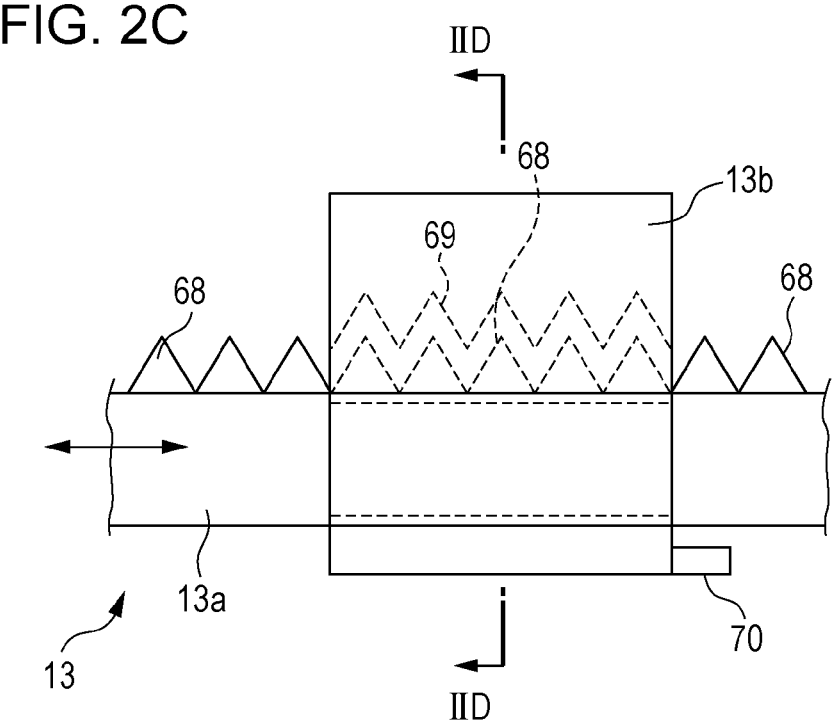
FIG. 2C is an enlarged schematic plan view illustrating with dotted lines a state in which an operating-unit supporting section and a slide rail of the hand operation mechanism engage with each other in the first embodiment.
Figure 2D:
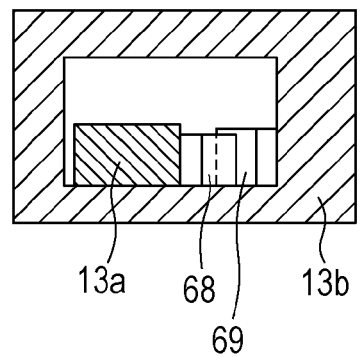
FIG. 2D is a schematic sectional view taken along line IID-IID in FIG. 2C, and illustrates a state in which a slide ratchet unit and a slide bearing ratchet unit engage with each other in the first embodiment.
Figure 2E:
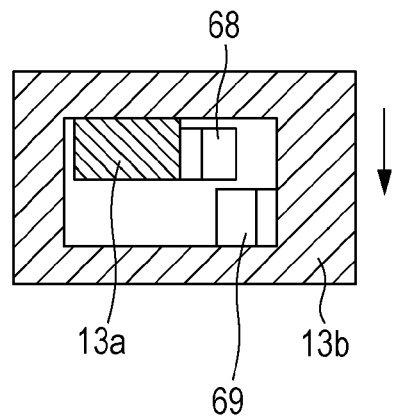
FIG. 2E is a schematic sectional view taken along line IID-IID in FIG. 2C, and illustrates a state in which the slide ratchet unit and the slide bearing ratchet unit are disengaged from each other in the first embodiment.
Figure 2F:
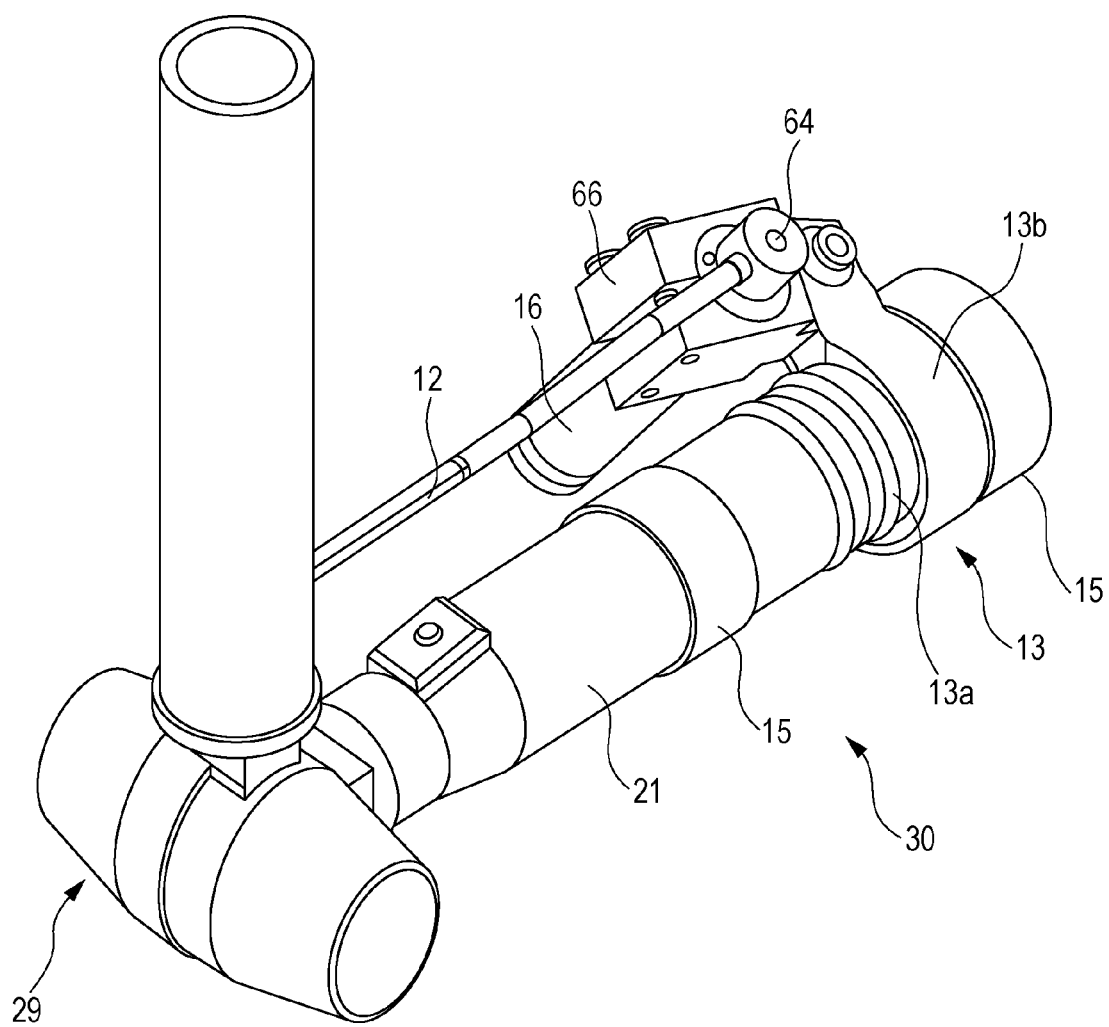
FIG. 2F is a perspective view of an example of the hand operation mechanism at the master side in the first embodiment.
Figure 2G:
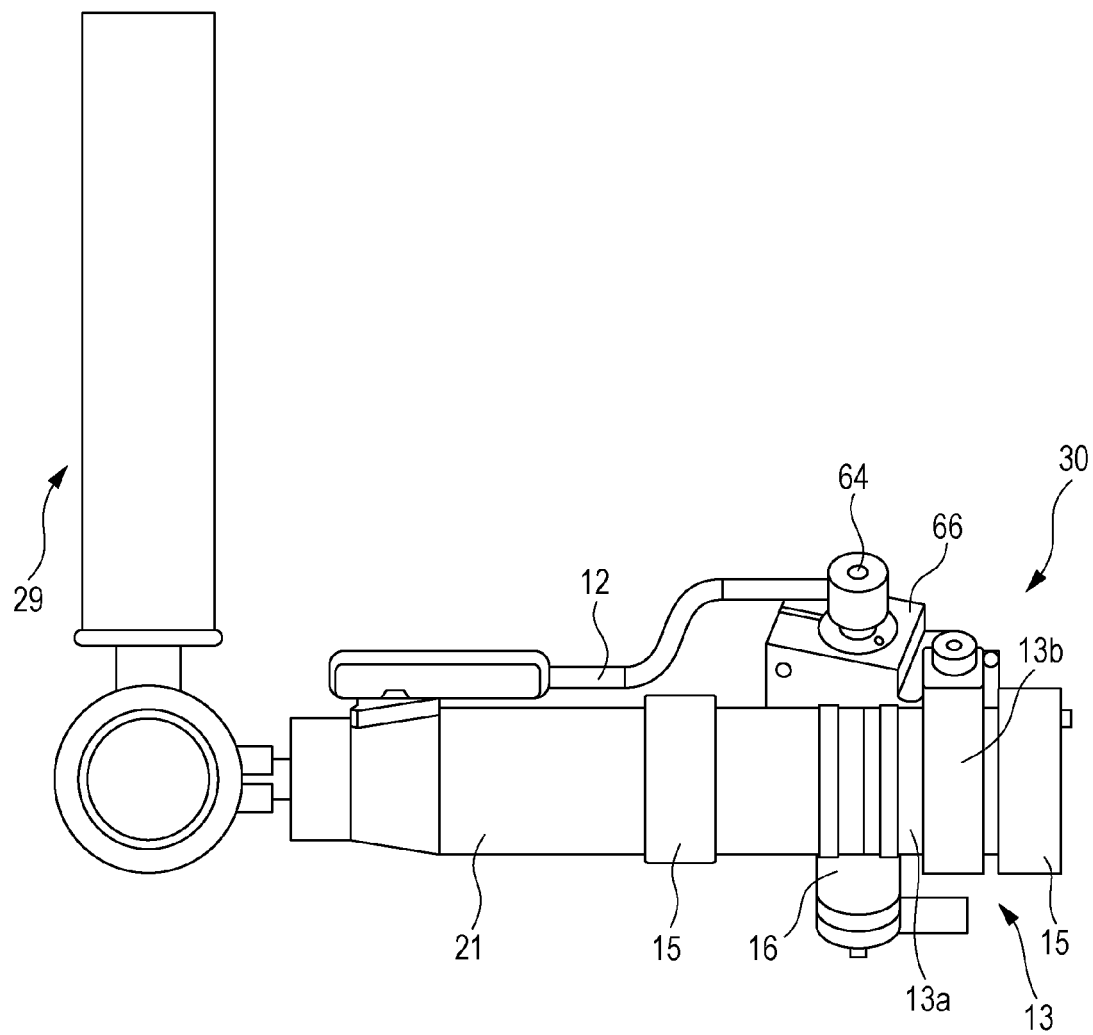
FIG. 2G is a front view of the example of the hand operation mechanism at the master side in the first embodiment.
Figure 2H:
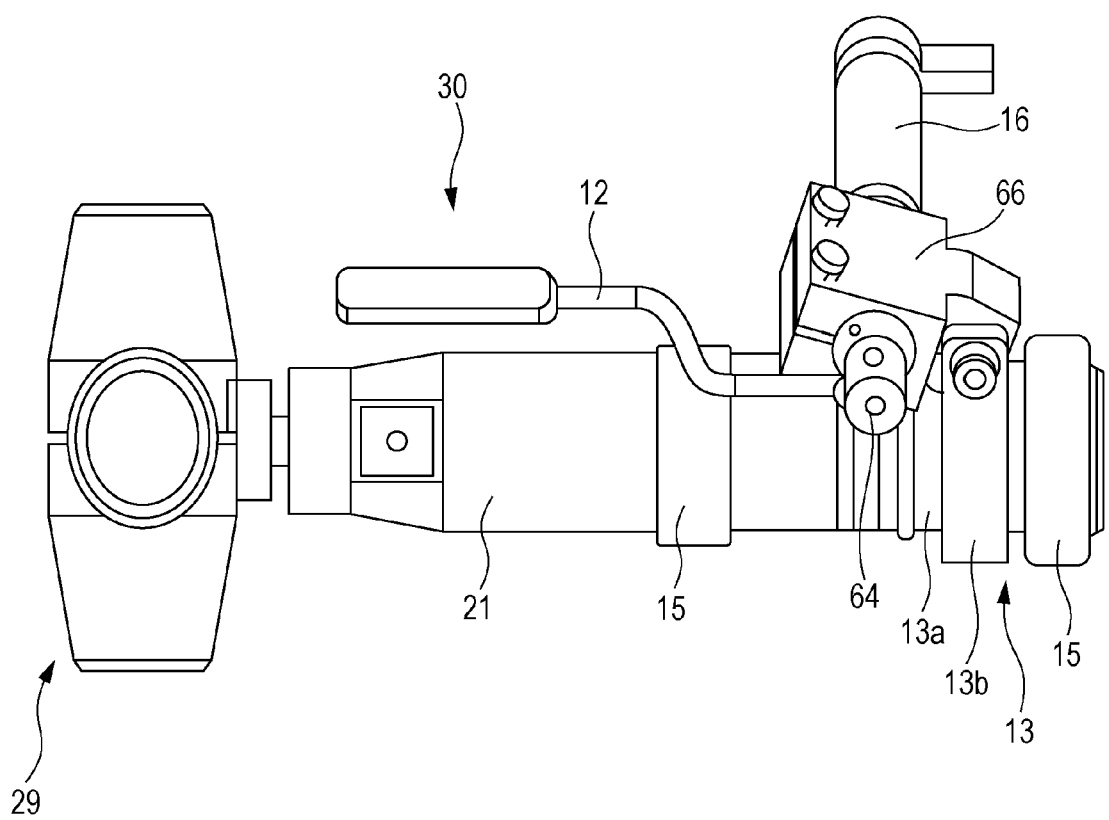
FIG. 2H is a plan view of the example of the hand operation mechanism at the master side in the first embodiment.

FIG. 2A is a top plan view of the hand operation mechanism 30 at a master side. FIG. 2B is an oblique transverse perspective view of the hand operation mechanism 30. FIG. 2C is an enlarged plan view illustrating with dotted lines a state in which the slide rail 13a and the operating-unit supporting section 13b of the hand operation mechanism 30 engage with each other. FIG. 2D is a sectional view taken along line IID-IID in FIG. 2C, and illustrates a state in which a slide ratchet unit 68 and a slide bearing ratchet unit 69 engage with each other. FIG. 2E is a sectional view taken along line IID-IID in FIG. 2C, and illustrates a state in which the slide ratchet unit 68 and the slide bearing ratchet unit 69 are disengaged from each other. FIGS. 2F to 2H are, respectively, a perspective view, a front view, and a plan view of an example of the hand operation mechanism at the master side in the first embodiment.

Figure 3A:
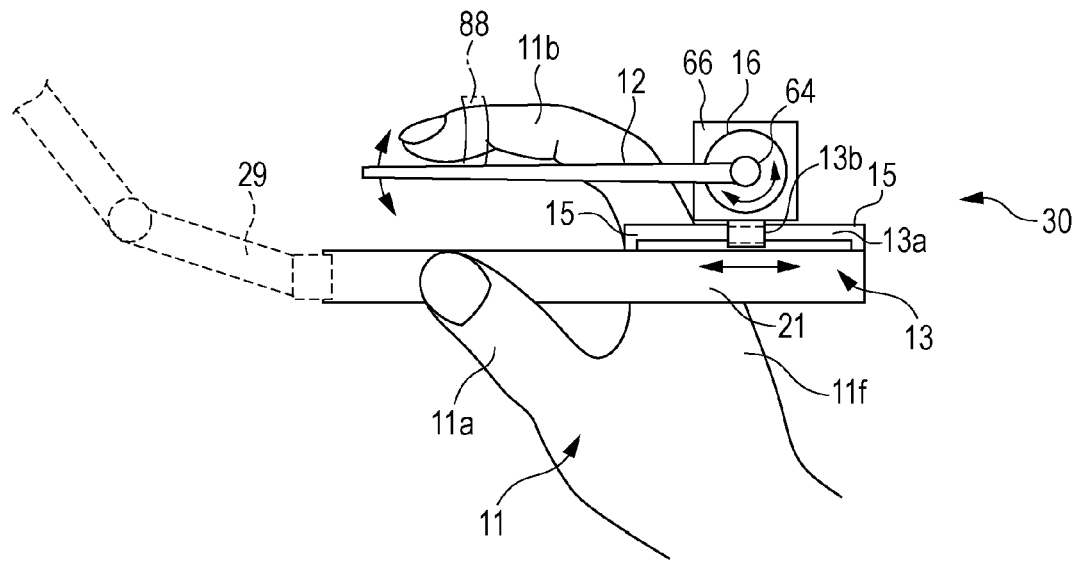
FIG. 3A is a plan view of the hand operation mechanism that is gripped by an operator in the first embodiment.
Figure 3B:
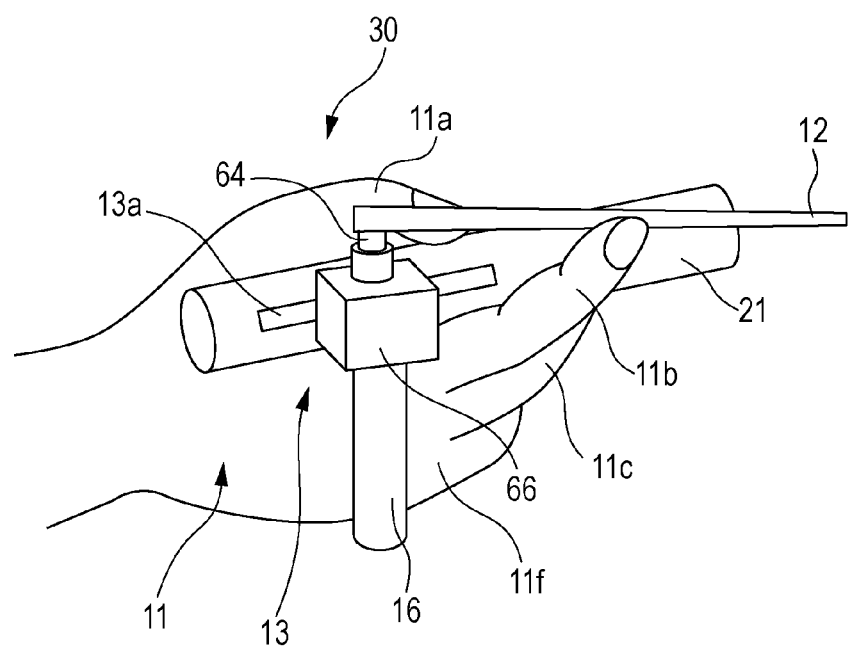
FIG. 3B is a perspective view of the hand operation mechanism that is gripped by the operator in the first embodiment.
Figure 4A:
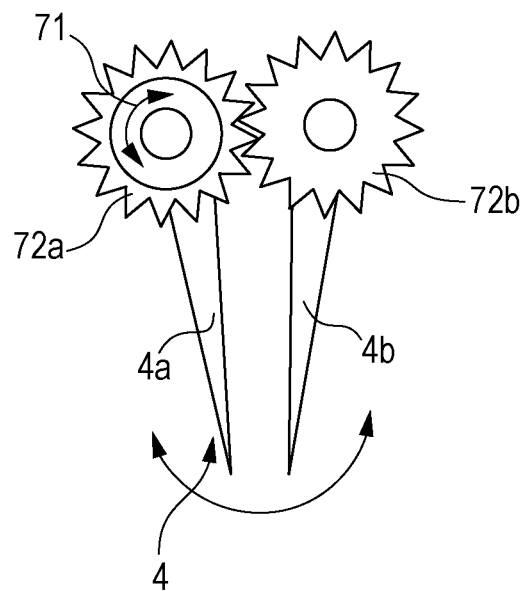
FIG. 4A is a top plan view of a hand mechanism at a slave side in the first embodiment.
Figure 4B:
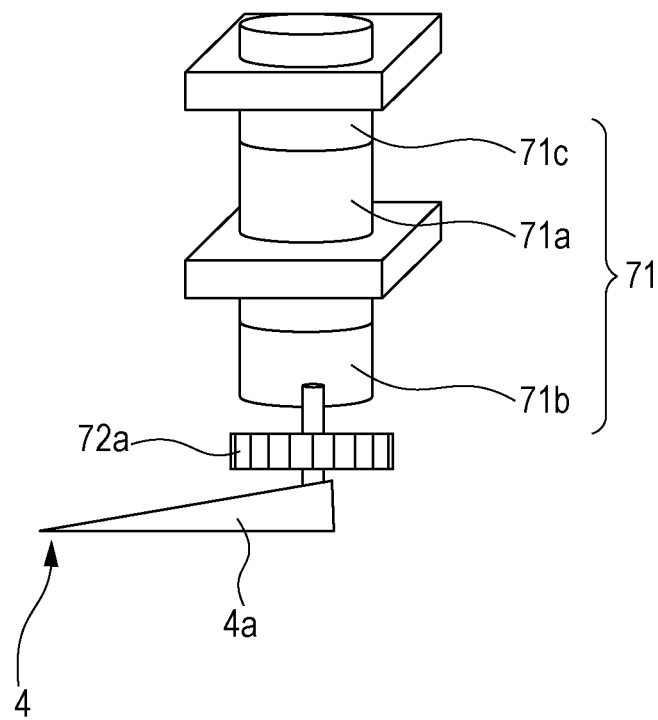
FIG. 4B is an oblique transverse perspective view of the hand mechanism at the slave side in the first embodiment.

FIG. 3A is a plan view of the hand operation mechanism 30 that is gripped by the operator 11. FIG. 3B is a perspective view of the hand operation mechanism 30 that is gripped by the operator 11. FIG. 4A is a top plan view of the hand mechanism 4 at a slave side. FIG. 4B is an oblique transverse perspective view of the hand mechanism 4 at the slave side.

In this example, the opening and closing operation unit 12 is a rod-like (lever-like) member in which one end thereof is connected to a motor bearing unit 64 (described later) and the other end thereof is a free end, and that rotates around the axis of the motor bearing unit 64 at the one end when the operator 11 pushes or stops pushing the tips thereof with his/her finger.

The slide rail 13a is a member that slides in the interior of the operating-unit supporting section 13b having a roughly cylindrical shape, and is provided with the slide ratchet unit 68 having inverted V-shaped teeth on one side surface. It is also possible to form a ratchet structure in which the position of the opening and closing operation unit 12 according to the first embodiment with respect to the slide unit 13 is settable in steps towards the front, and is settable so as to move smoothly towards the back.

The operating-unit supporting section 13b is formed of a cylindrical member including the slide bearing ratchet unit 69 having inverted V-shaped teeth on one side surface of an inner portion of the operating-unit supporting section 13b. The operating-unit supporting section 13b functions as a slide bearing section and is fixed to one side surface of the grip unit 21. The slide rail 13a is made movable in the interior of the operating-unit supporting section 13b and the slide ratchet unit 68 is engaged with the slide bearing ratchet unit 69, so that the slide rail 13a is fixed to the operating-unit supporting section 13b so as to be immovable in a slide axial direction. When the slide ratchet unit 68 is disengaged from the slide bearing ratchet unit 69, the slide rail 13a is caused to be movable with respect to the operating-unit supporting section 13b in the slide axial direction. The slide ratchet unit 68 is engaged with and disengaged from the slide bearing ratchet unit 69 as follows. For example, as illustrated in FIG. 2D, the slide ratchet unit 68 and the slide bearing ratchet unit 69 are engaged with each other by moving the operating-unit supporting section 13b upward with respect to the slide rail 13a and moving the slide bearing ratchet unit 69 so as to oppose the slide ratchet unit 68. In contrast, as illustrated in FIG. 2E, the slide ratchet unit 68 and the slide bearing ratchet unit 69 are disengaged from each other by moving the operating-unit supporting section 13b downward with respect to the slide rail 13a from the state illustrated in FIG. 2D and by moving the slide bearing ratchet unit 69 with respect to the slide ratchet unit 68 so as not oppose each other.

By fixing stoppers 15 to two end portions of the slide rail 13a and stopping the sliding of the operating-unit supporting section 13b along the slide rail 13a by the stoppers 15, the range of movement of the operating-unit supporting section 13b is restricted.

Figure 9B:
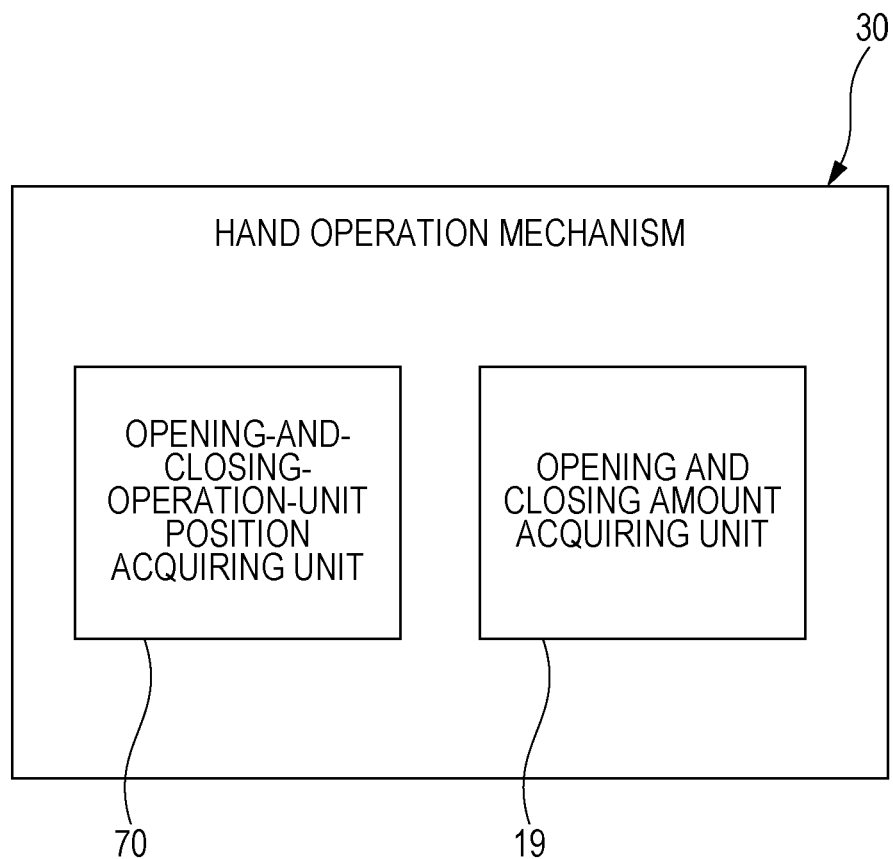
FIG. 9B is a block diagram of a detailed structure of the hand operation mechanism of the master slave apparatus in the first embodiment of the present disclosure.

As illustrated in FIG. 9B, the hand operation mechanism 30 includes an opening-and-closing-operation-unit position acquiring sensor 70, serving as a sensor, and an encoder 19.

As illustrated in FIG. 2C, the opening-and-closing-operation-unit position acquiring sensor 70 functions as an example of an opening-and-closing-operation-unit position acquiring unit (see FIG. 9B), and is fixed to the operating-unit supporting section 13b situated near the slide rail 13a. The opening-and-closing-operation-unit position acquiring sensor 70 is a sensor that acquires the position of the opening and closing operation unit 12 at operating-unit supporting section 13b with respect to the slide rail 13a (the position of the opening and closing operation unit 12 with respect to an end portion of the master mechanism 29, that is, the position of the opening and closing operation unit 12 with respect to (a master-mechanism connection end portion at) the slide rail 13a of the slide unit 13). Examples of the sensor include a magnetic sensor and other types of sensors. Using the opening-and-closing-operation-unit position acquiring sensor 70, the operator 11 acquires the position of the opening and closing operation unit 12 with respect to the slide unit 13 (opening-and-closing-operation-unit position) at each sample time from a timer 43B when moving the opening and closing operation unit 12 and the slide unit 13. Then, information about this position is output to a master hand controlling unit 22 from the opening-and-closing-operation-unit position acquiring sensor 70.

The opening and closing operation unit 12 is connected to a master motor unit 16 via the motor bearing unit 64. The master motor unit 16 includes a motor 18, a gear 17, and the encoder 19 (see FIG. 2B). The motor 18 is provided for providing* resistance with respect to forward/reverse rotation or rotational motion of the opening and closing operation unit 12. The gear 17 is connected to a rotational shaft of the motor 18. The encoder 19 measures the rotational angle of the motor 18. The encoder 19 functions as an example of an opening-and-closing amount acquiring unit (see FIG. 9B). One example of the opening and closing amount is the rotational angle of the motor. A motor upper-portion fixing unit 66 is a member for fixing the upper portion of the motor 18 thereto, and a motor central-portion fixing unit 67 is a member for fixing the central portion of the motor 18 thereto. Further, when the opening and closing operation unit 12 corresponds to one of a pair of tweezers instead of a pair of tweezers, as illustrated in FIG. 3A, the operator 12 can operate it using only the index finger 11b, and firmly grip the grip unit 21 with, for example, another finger, such as the thumb 11a, and the back 11f of the hand. Therefore, it is possible to stably move the master robot 3 and to stably open and close the opening and closing operation unit 12 that corresponds to the one of the pair of tweezers. Further, as illustrated in FIG. 3B, when the master motor unit 16, serving as an example of a member that is connected to the opening and closing operation unit 12, is disposed along the back 11f of the hand of the operator 11, it is possible to prevent unintentional rotation of the grip unit 21 towards the master motor unit 16 (or towards the small finger of the operator 11) caused by, for example, the weight of the master motor unit 16. When the master motor unit 16 is a small motor, the master motor unit 16 may be covered with a cover having a size that can be placed on the back of the hand, so that the master motor unit 16 has a size that can be placed on the back of the hand. In addition, by placing a sponge material, which is used in, for example, a grip portion of an automobile, around the grip unit 21, it is possible to firmly grip the grip unit 21 with the thumb, so that it is possible to further prevent the grip unit 21 from rotating. Although, in the first embodiment, the master motor unit 16 is used as a member that is connected to the opening and closing operation unit 12, the member that is connected to the opening and closing operation unit 12 is not limited thereto. It is possible for the member to be formed of a rod-like auxiliary supporting member that is directly or indirectly connected to the grip unit 21 in a direction that crosses a longitudinal direction of the grip unit 21, and for the auxiliary supporting member to contact the back of the hand to achieve a rotation prevention function.

When the opening and closing operation unit 12 is to be closed, the opening and closing operation unit 12 only needs to be pushed down by the index finger 11b. However, when the opening and closing operation unit 12 is to be opened, it may be difficult to open the opening and closing operation unit 12 with the index finger 11b. In such a case, when, as indicated by an alternate long and short dashed line in FIG. 3A, a finger band 88 is provided at the opening and closing operation unit 12 and the index finger 11b is inserted in the finger band 88, an opening movement of the index finger 11b allows the opening and closing operation unit 12 to easily follow the index finger 11b, so that it possible to simply and reliably open the opening and closing operation unit 12.

The grip unit 21 is disposed by being connecting one end of the grip unit 21 to an end portion of the robot arm serving as an example of the master mechanism 29. In an example, as illustrated in FIG. 3A, the operator 11 grips the grip unit 21 with part of the back 11f of the hand and the thumb 11a, and grips the grip unit 21 with the middle finger 11c from below the grip unit 21 so as to support it. The opening and closing operation unit 12 is opened and closed with the index finger 11b. The slide unit 13 is positioned at an upper portion of the grip unit 21. Since the hand operation mechanism 30 is gripped with the hand from below the hand operation mechanism 30, when the master robot 3 is operated, the operator 11 can stably operate the master robot 3 by placing his/her elbow on, for example, a desk.

The hand mechanism 4 has the following structure.

The hand mechanism 4 is connected to an end portion of a robot arm (serving as an example of the slave mechanism 41). The hand mechanism 4 follows the opening and closing of the opening and closing operation unit 12, so that the pair of opening and closing members 4a and 4b of the hand mechanism 4 are opened and closed. This causes, for example, a part 5 to be gripped or ungripped.

The pair of opening and closing members 4a and 4b of the hand mechanism 4 are opened and closed by a slave motor unit 71. The slave motor unit 71 includes a motor 71a, a gear 71b, and an encoder 71c. The motor 71a is provided for rotating the opening and closing member 4a. The gear 71b is connected to a rotational shaft of the motor 71a. The encoder 71c measures the rotational angle of the motor 71a. A gear unit 72a and a gear unit 72b are fixed to base end portions of the respective opening and closing members 4a and 4b of the tweezers. The gear unit 72a and the opening and closing member 4a are fixed to a rotational shaft of the gear 71b. The gear unit 72a is disposed so as to engage with the gear unit 72b. Therefore, by rotationally driving the motor 71a in forward and reverse directions, the gear unit 72a and the opening and closing member 4a rotate in the forward and reverse directions via the gear 71b, so that the gear unit 72b engaged with the gear unit 72a and the opening and closing member 4b rotate in the forward and reverse directions. As a result, by rotationally driving the motor 71a in the forward and reverse directions, the pair of opening and closing members 4a and 4b are opened and closed.

The hand mechanism 4 includes the force measuring device 1. As illustrated in FIG. 10, the force measuring device 1 is a device that measures a force related to the slave robot 2, and includes a force detecting unit 50 and a gripping force detecting unit 55. The force measuring device 1 is formed as part of the slave robot 2 and as part of the slave apparatus 81.

The force detecting unit 50 of the force measuring device 1 functions as an example of a force information acquiring unit that acquires force information about a force applied to the slave mechanism 41 from the outside. The force detecting unit 50 is disposed at a wrist of the hand mechanism 4 and measures force that acts upon the vicinity of the insertion opening 6 or a baseplate 7 from the part 5. The force detecting unit 50 is described in detail below. The gripping force detecting unit 55 of the force measuring device 1 functions as an example of a gripping force information acquiring unit that acquires gripping force information about gripping force generated when the object 5 is gripped by the hand mechanism 4. The gripping force detecting unit 55 is set at the hand mechanism 4, and measures gripping force when the part 5 is gripped by the hand mechanism 4. The details of the gripping force detecting unit 55 is described below.

An imaging device 14, such as a camera, is disposed at a side surface of the work table 9, and performs imaging on the part 5 or the insertion opening 6 to display an image imaged by the imaging device 14 on a monitor 10a.

When the operator 11 operates the master robot 3 while confirming the image imaged by the imaging device 14 on the monitor 10a, the slave robot 2 operates. Further, by rotating the opening and closing operation unit 12, disposed at an end of the master robot 3, around a fulcrum so as to open and close the opening and closing operation unit 12, the hand mechanism 4, disposed at an end of the slave robot 2, is opened and closed.

Force measured by the force detecting unit 50 of the force measuring device 1 is fed back from the slave robot 2 to the master robot 3 by the master hand controlling device 23 via the database input/output unit 45 from the force detecting unit 50. This makes it possible for the operator 11 to operate the slave robot 2 using the slave hand controlling device 31 with a sensation of directly operating the part 5. A gripping force that is generated when the hand mechanism 4 is opened and closed and the part 5 is gripped is detected by the gripping force detecting unit 55. The detected gripping force is fed back to the opening and closing operation unit 12 of the master robot 3 from the gripping force detecting unit 55 via the database input/output unit 45 and via the slave hand controlling device 31 and the master hand controlling device 23. This makes it possible for the operator 1 to perform an operation while feeling a force generated when the part 5 has been gripped.

An outline of the procedure for operating the master slave apparatus 100 is described using FIGS. 5A to 5E, FIGS. 6A to 6E, FIGS. 7A to 7E, and FIGS. 8A to 8E.

It is assumed that the mode of the opening and closing operation unit 12 is set to a reset mode by an initial setting by a control information setting unit 20. In the reset mode state, even if the opening and closing operation unit 12 or the master robot 3 is operated, the hand mechanism 4 or the slave robot 2 is in a state in which the hand mechanism 4 or the slave robot 2 does not temporarily operate.

In the reset mode, after the operator 11 has manually determined the position and orientation of the master robot 3 and the opening and closing operation unit 12, the operator 11 presses the reset button 82, so that the control mode can be changed from the reset mode to a movement mode.

In the movement mode, when the operator 11 operates the master robot 3 and the opening and closing operation unit 12, on the basis of the position of the master robot moved by the operator 11, the slave robot 2 moves and the part 5 is inserted into the insertion opening 6.

Figure 5A:
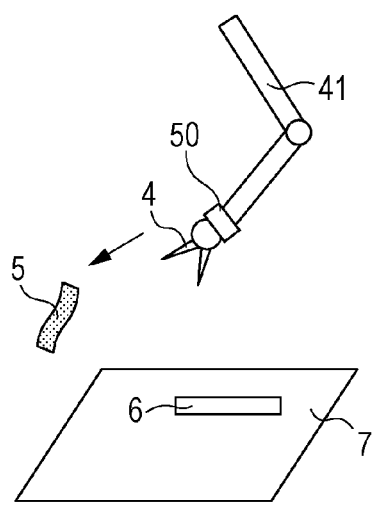
FIG. 5A illustrates an insertion operation for inserting a part at a slave mechanism in the first embodiment of the present disclosure.
Figure 6A:
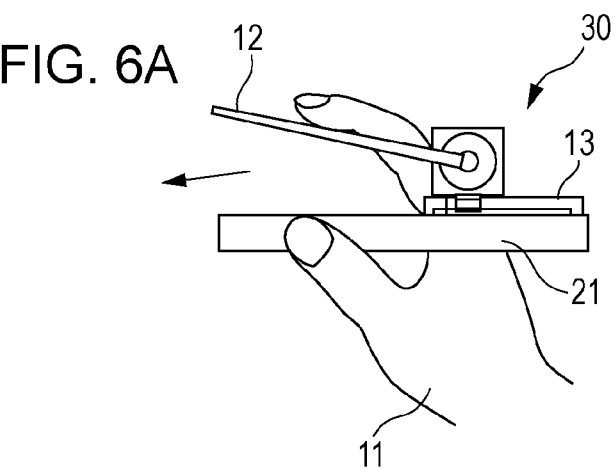
FIG. 6A illustrates an insertion operation for inserting a part at a master mechanism in the first embodiment of the present disclosure.

More specifically, as illustrated in FIG. 6A, when, with the operating-unit supporting section 13b of the slide unit 13 being positioned near a front end of the slide rail 13a, the operator 11 grips the master robot 3 and the opening and closing operation unit 12 and moves the master robot 3 by a large amount, as illustrated in FIG. 5A, the slave robot 2 operates and moves by a large amount towards the part 5.

Figure 5B:
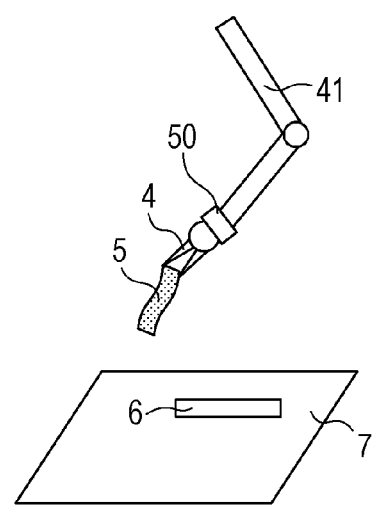
FIG. 5B illustrates the insertion operation for inserting the part at the slave mechanism in the first embodiment of the present disclosure.
Figure 5C:
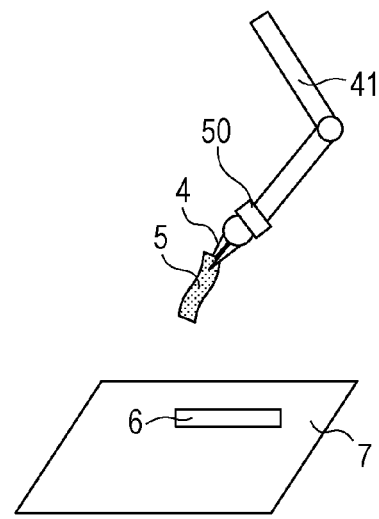
FIG. 5C illustrates the insertion operation for inserting the part at the slave mechanism in the first embodiment of the present disclosure.
Figure 6B:
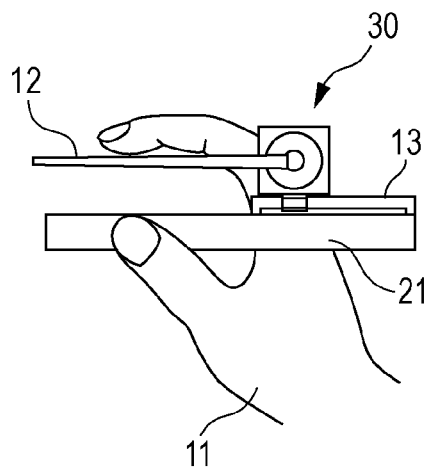
FIG. 6B illustrates the insertion operation for inserting the part at the master mechanism in the first embodiment of the present disclosure.
Figure 6C:
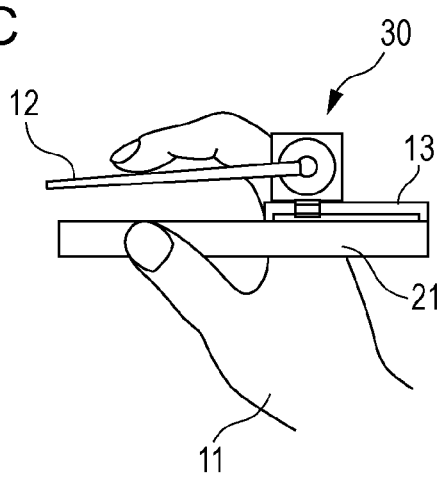
FIG. 6C illustrates the insertion operation for inserting the part at the master mechanism in the first embodiment of the present disclosure.

Next, as illustrated in FIGS. 6B and 6C, when, using his/her index finger 11b, the operator 11 rotates the opening and closing operation unit 12 towards the grip unit 21 and performs a closing operation to close the tips of the opening and closing operation unit 12, as illustrated in FIGS. 5B, and 5C, the hand mechanism 4 of the slave robot 2 is closed to grip the part 5 with the pair of opening and closing members 4a and 4b. The gripping force that acts upon the part 5 when it is gripped is measured with the gripping force detecting unit 55, and the information about the measured gripping force is fed back to the opening and closing operation unit 12 by controlling driving of the motor 18 by the master hand controlling device 23. Under the condition that the driving of the motor 18 is controlled by the master hand controlling device 23, while the operator 11 feels the gripping force at the opening and closing operation unit 12, the operator 11 can adjust the magnitude of the gripping force with respect to the opening and closing operation unit 12.

Figure 5D:
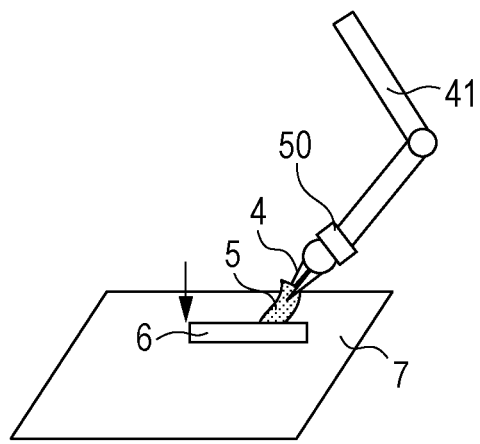
FIG. 5D illustrates the insertion operation for inserting the part at the slave mechanism in the first embodiment of the present disclosure.
Figure 5E:
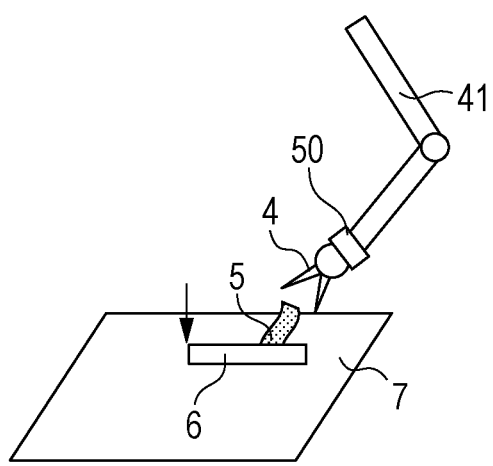
FIG. 5E illustrates the insertion operation for inserting the part at the slave mechanism in the first embodiment of the present disclosure.
Figure 6D:
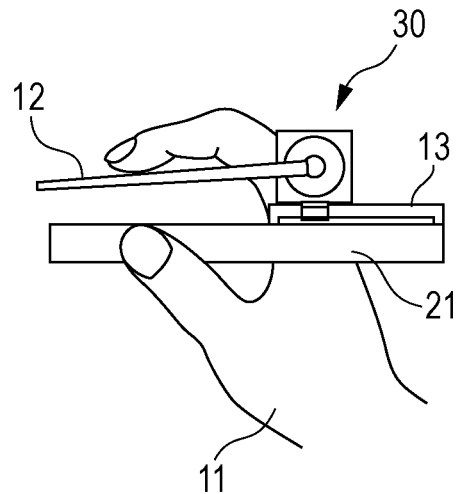
FIG. 6D illustrates the insertion operation for inserting the part at the master mechanism in the first embodiment of the present disclosure.
Figure 6E:
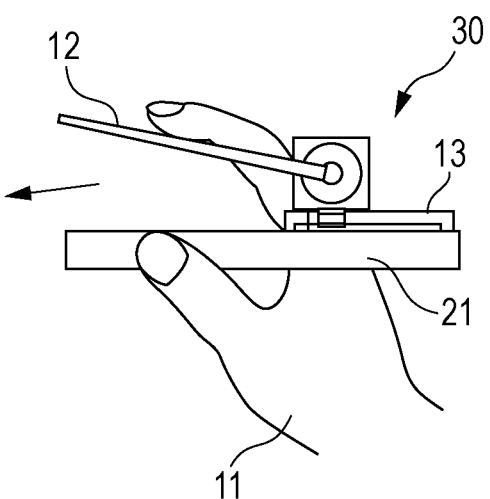
FIG. 6E illustrates the insertion operation for inserting the part at the master mechanism in the first embodiment of the present disclosure.

Next, as illustrated in FIGS. 6D and 6E, when, under the condition in which the driving of the motor 18 is controlled by the master hand controlling device 23, the force that the operator 11 applies to the opening and closing operation unit 12 with his/her index finger 11b is gradually reduced, the driving of the motor 18 is controlled so that the opening and closing operation unit 12 is opened. In accordance with this, as illustrated in FIGS. 5D and 5E, the hand mechanism 4 of the slave robot 2 is opened.

Figure 7A:
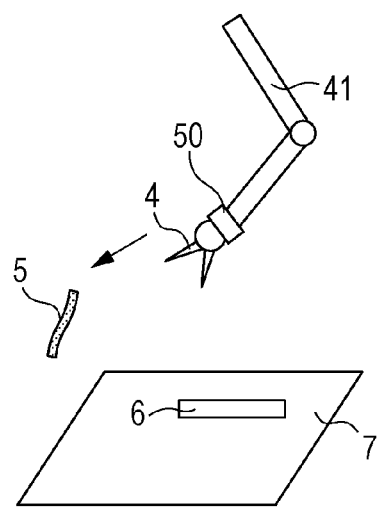
FIG. 7A illustrates an insertion operation for inserting a part at the slave mechanism in the first embodiment of the present disclosure.
Figure 7B:
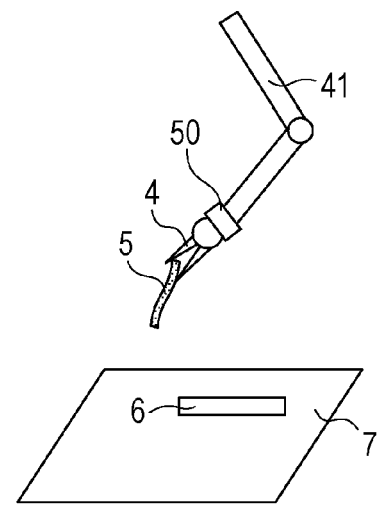
FIG. 7B illustrates the insertion operation for inserting the part at the slave mechanism in the first embodiment of the present disclosure.
Figure 7C:
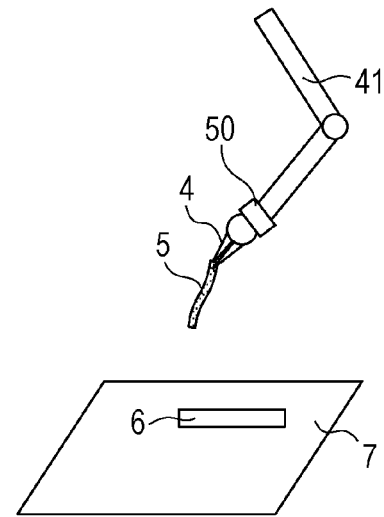
FIG. 7C illustrates the insertion operation for inserting the part at the slave mechanism in the first embodiment of the present disclosure.
Figure 7D:
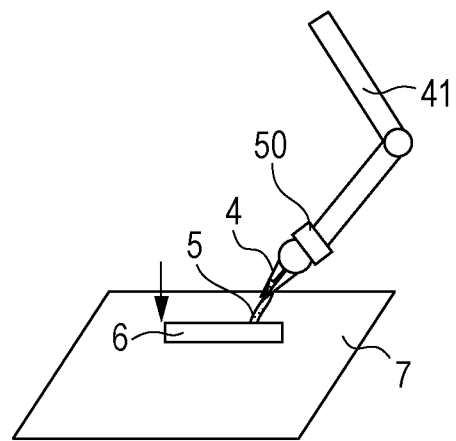
FIG. 7D illustrates the insertion operation for inserting the part at the slave mechanism in the first embodiment of the present disclosure.
Figure 7E:
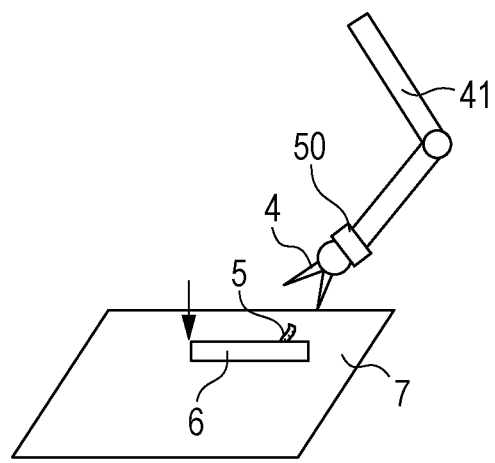
FIG. 7E illustrates the insertion operation for inserting the part at the slave mechanism in the first embodiment of the present disclosure.
Figure 8A:
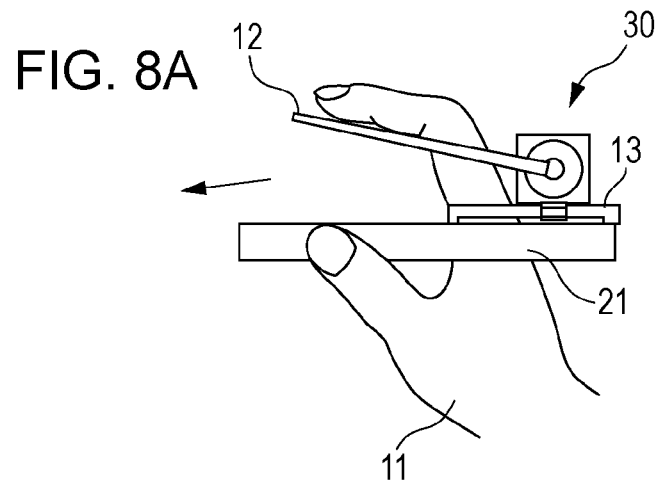
FIG. 8A illustrates an insertion operation for inserting a part at the master mechanism in the first embodiment of the present disclosure.
Figure 8B:
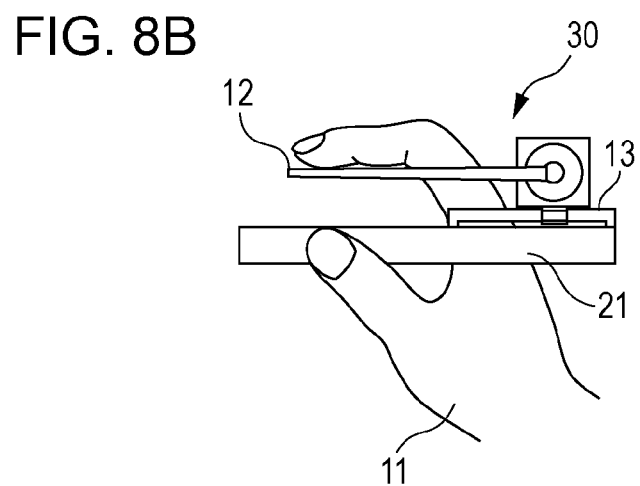
FIG. 8B illustrates the insertion operation for inserting the part at the master mechanism in the first embodiment of the present disclosure.
Figure 8C:
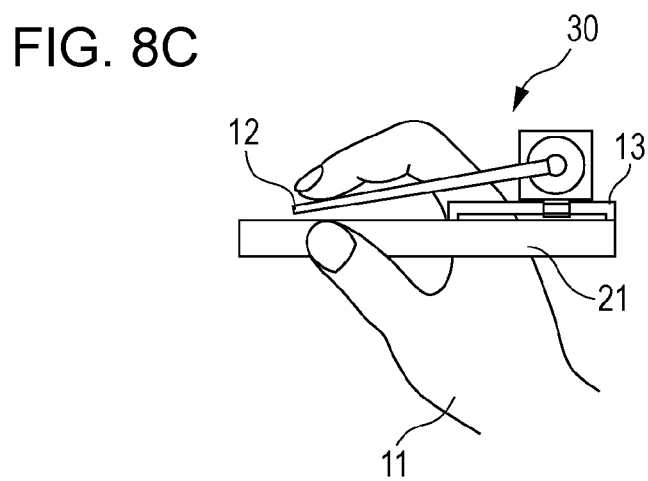
FIG. 8C illustrates the insertion operation for inserting the part at the master mechanism in the first embodiment of the present disclosure.
Figure 8D:
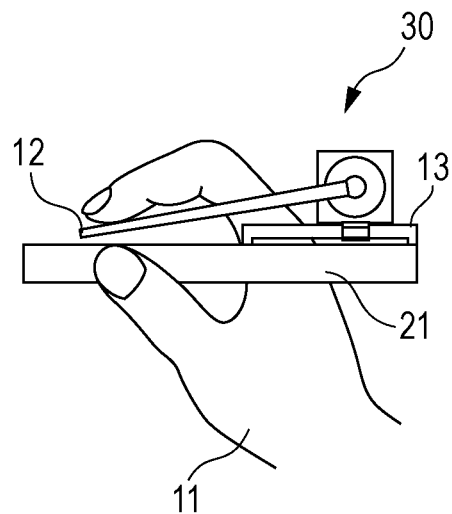
FIG. 8D illustrates the insertion operation for inserting the part at the master mechanism in the first embodiment of the present disclosure.
Figure 8E:
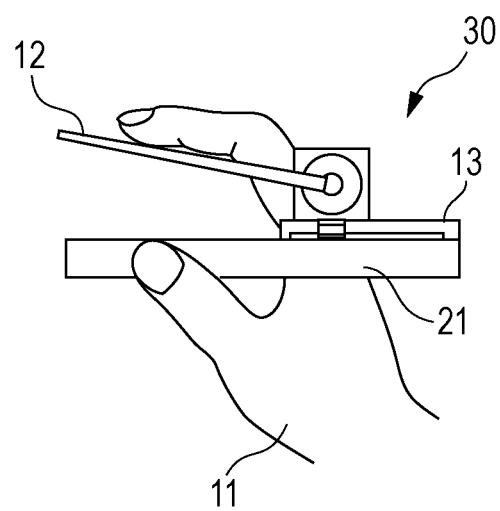
FIG. 8E illustrates the insertion operation for inserting the part at the master mechanism in the first embodiment of the present disclosure.

In FIG. 7A, since an operation is performed on a part that is smaller than that in FIG. 5A, the opening and closing operation unit 12 is slid along the slide unit 13 towards the back side with respect to the slide unit 13. That is, the operating-unit supporting section 13b of the slide unit 13 is positioned close to a back end of the slide rail 13a. This makes it possible to open and close the hand mechanism 4 by an opening and closing amount that is smaller than that of the opening and closing operation unit 12 when the operator 11 is to operate the opening and closing operation unit 12 and open and close the hand mechanism 4 with the index finger 11b. That is, it becomes possible to perform delicate tweezer operations. In one example, a movement gain is set using the control information setting unit 20 of the master hand controlling device 23 (described later) so that the hand mechanism 4 is opened and closed by an opening and closing amount that is half that of the opening and closing operation unit 12.

Next, the master robot 3, the slave robot 2, and the force measuring device 1 of the master slave apparatus 100 according to the first embodiment are described in detail. FIG. 9A illustrates a structure including the master robot 3, the slave robot 2, the force measuring device 1, the operation information database 44, the control information database 42, a timer 43A, and the database input/output unit 45. FIG. 10 illustrates a detailed structure of the force measuring device 1. FIG. 9B is a block diagram of a detailed structure of the hand operation mechanism 30.

Force Measuring Device 1

The force measuring device 1 according to the first embodiment is a device that acquires information about a force related to the slave robot 2 and the hand mechanism 4. As illustrated in FIG. 10, the force measuring device 1 includes the force detecting unit 50 and the gripping force detecting unit 55. Independently of the force measuring device 1, the master apparatus 80 includes a force determining unit 51 and a determination result informing unit 52. However, the force measuring device 1 may include the force determining unit 51 and the determination result informing unit 52.

Force Detecting Unit 50

As illustrated in FIG. 1, the force detecting unit 50 is disposed at a position corresponding to the position of the wrist of the hand mechanism 4 between the slave robot 2 and the hand mechanism 4, and measures a force that is generated when the slave robot 2 contacts an external object (for example, a force that acts upon the vicinity of the insertion opening 6 or the baseplate 7 from the part 5 in the aforementioned operation) (force information). More specifically, the force detecting unit 50 is, for example, a force sensor that is capable of performing six-axis measurements. However, the force detecting unit 50 may be a three-axis force sensor that is capable of performing measurements in only positional directions. Information about the force measured by the force detecting unit 50 is stored as a result of being output from the force detecting unit 50 to the operation information database 44 via the database input/output unit 45.

Gripping Force Detecting Unit 55

Figure 11:
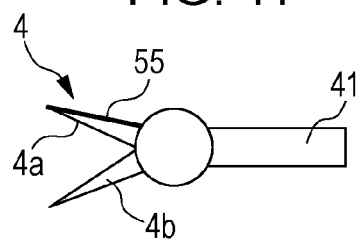
FIG. 11 illustrates a gripping force detecting unit in the first embodiment of the present disclosure.

As illustrated in FIG. 11, the gripping force detecting unit 55 is disposed at one of the opening and closing members (for example, the opening and closing member 4a) of the hand mechanism 4, and measures a gripping force that is generated when the hand mechanism 4 grips an object, such as the part 5 (for example, a gripping force that is generated when the pair of opening and closing members 4a and 4b of the hand mechanism 4 grip the part 5 in the above-described operation) (gripping force information). More specifically, the gripping force detecting unit 55 is, for example, a one-axis strain sensor. Information about the gripping force measured by the gripping force detecting unit 55 is stored by being output to the operation information database 44 from the gripping force detecting unit 55 via the database input/output unit 45.

Timer 43A

After the passage of a given time (such as every 1 msec), the timer 43A outputs to the database input/output unit 45 an instruction for causing the database input/output unit 45, the slave hand controlling unit 32, and the master hand controlling unit 22 to perform their operations.

Force Determining Unit 51

When a force detected by the force detecting unit 50 or the gripping force detecting unit 55 is greater than or equal to a predetermined threshold value (such as 5 N), the force determining unit 51 determines that a load is exerted upon, for example, the part 5. The determination result is, along with information about the force used in the determination, output to the determination result informing unit 52 from the force determining unit 51. The determination result is stored as a result of being output to the operation information database 44 from the force determining unit 51 via the database input/output unit 45.

Determination Result Informing Unit 52

Figure 12A:
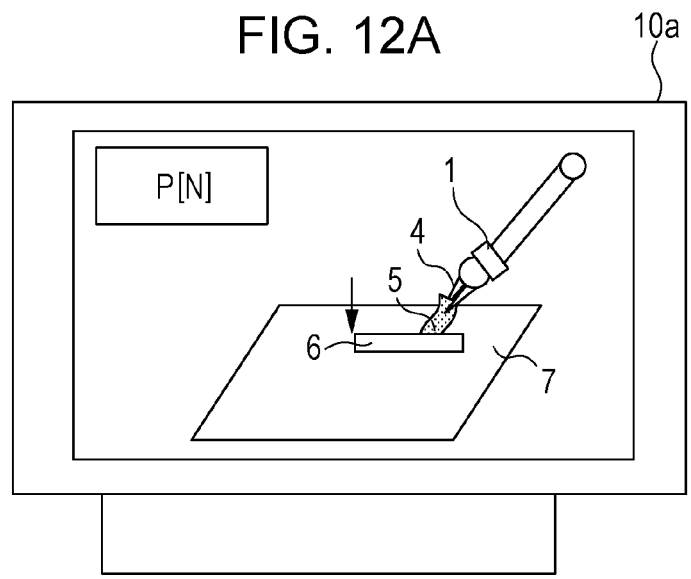
FIG. 12A illustrates an example of a determination result informing unit in the first embodiment of the present disclosure.
Figure 12B:
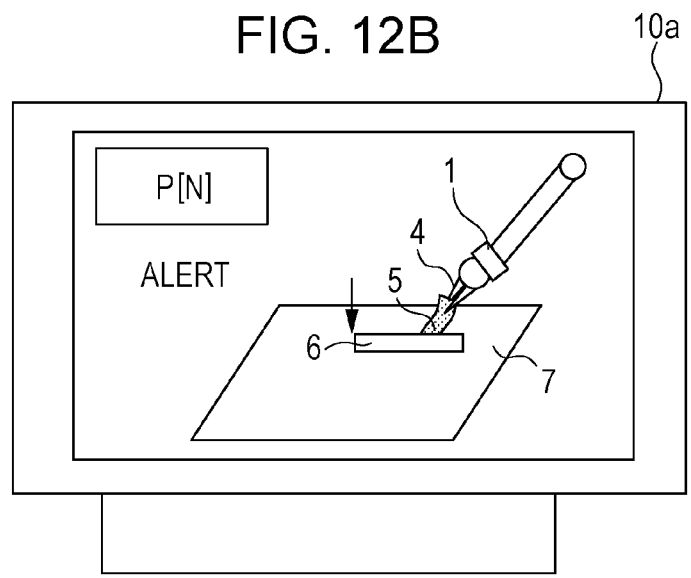
FIG. 12B illustrates the example of the determination result informing unit in the first embodiment of the present disclosure.

The determination result informing unit 52 is a unit for informing the operator 11 about the result of determination performed by the force determining unit 51, and is, for example, a monitor or a speaker. More specifically, as in the monitor 10a shown in FIG. 12A, a detected force P [N] is, along with an image of the vicinity of the slave robot 2, displayed on the determination result informing unit 52. Here, when the force determining unit 51 determines that a load is exerted upon, for example, the part 5, the determination result informing unit 52 displays a warning, such as "ALERT", as illustrated in FIG. 12B.

When the force determining unit 51 determines that a load is exerted upon, for example, the part 5, a speaker 10b illustrated in FIG. 1 issues a warning sound, and the determination result informing unit 52 warns the operator 11.

Master Mechanism 29 and Slave Mechanism 41

The master mechanism 29 is a robot that the operator 11 directly touches and operates. The master mechanism 29 acquires position information for each sample time when the operator 11 moves the master mechanism 29, and outputs the position information to the master hand controlling unit 22. Further, in accordance with the force information and the gripping force information measured by the force measuring device 1, the master hand controlling unit 22 controls the operation of the master mechanism 29. When the operator 11 directly touches and operates the master mechanism 29, the operator 11 moves the grip unit 21 that is connected to an end of the master mechanism 29 with his/her hand in a desired direction (such as an up-down direction, a left-right direction, or a front-back direction) while supporting the grip unit 21 with his/her hand, so that the operator 11 directly operates the robot arm serving as an example of the master mechanism 29.

The slave mechanism 41 is a robot that inserts the part 5 into the insertion opening 6. The slave mechanism 41 acquires information about the position of the slave mechanism 41 for each time and outputs this position information to the master hand controlling unit 22 via the slave hand controlling unit 32. Further, in accordance with generated position information provided by an operation information generating unit 53 on the basis of the position information acquired by the master mechanism 29, the master hand controlling unit 22 controls the operation of the slave mechanism 41 via the slave hand controlling unit 32.

Control Information Setting Unit 20

On the basis of whether or not an input operation is performed using the reset button 82 via the database input/output unit 45, when, at the master robot 3, the master mechanism 29 and the opening and closing unit 12 and the slide unit 13 of the hand operation mechanism 30 are operated, a control mode, that is, either a reset mode or a movement mode, is switched. When the reset button 82 is pressed and the reset mode is set, the control information setting unit 20 sets the control mode to "0". When the reset button 82 is not pressed and the movement mode is set, the control information setting unit 20 sets the control mode of the opening and closing operation unit 12 to "1". Then, each piece of information that has been set by the control information setting unit 20 is stored by being output to the control information database 42 via the database input/output unit 45.

Further, the control information setting unit 20 sets a hand angle gain. The term "hand angle gain" refers to gain that is provided when the opening and closing members 4a and 4b of the hand mechanism 4 are opened and closed on the basis of the amount of change in the opening and closing angle when the opening and closing operation unit 12 is opened and closed. The control information setting unit 20 causes information about the hand angle gain to be stored in the control information database 42.

The control information setting unit 20 sets force gain provided when the force detected by the force detecting unit 50 is transmitted to the master mechanism 29. When the force detecting unit 50 is a six-axis force sensor, the control information setting unit 20 sets the force gain for a total of six axes (three axes in the positional directions and three axes in the orientation directions). In the first embodiment, the control information setting unit 20 sets the force gain. The control information setting unit 20 may calculate the force gain from movement gain. More specifically, with the force gain for each axis being equal to $J \times 1/$(movement gain of each axis), the control information setting unit 20 sets the force gain. However, using the equation $J = Mm/Ms$ (where J is a constant and, for example, the weight of the slave mechanism 41 and the weight of the master mechanism 29 are Ms and Mm, respectively), on the basis of these weights, the control information setting unit 20 may determine the force gain; or the control information setting unit 20 may determine the force gain as appropriate so as not to be influenced by the inertia of the slave mechanism 41. The control information setting unit 20 causes information about the force gain to be stored in the control information database 42.

The control information setting unit 20 sets information about gripping force gain in the control information database 42. The term "gripping force gain" refers to gripping force gain when gripping force that is generated when the opening and closing operation unit 12 is opened and closed is fed back to the opening and closing operation unit 12. The control information setting unit 20 causes the information about the gripping force gain to be stored in the control information database 42.

In the first embodiment, the control information setting unit 20 sets the gripping force gain. The control information setting unit 20 may calculate the gripping force gain from a hand angle gain. More specifically, using the equation in which gripping force gain of each axis=1×1/(hand angle gain), the control information setting unit 20 calculates and sets the gripping force gain. Here, 1 is a constant.

Information about various settings may be previously stored in the control information database 42. Alternatively, using the input IF 8 disposed at a side surface of the work table 9, the operator 11 may input the information about the various settings in the control information database 42.

The reset mode is a mode in which the slave robot 2 and the hand mechanism 4 are temporarily not operated even if the master robot 3 or the opening and closing operation unit 12 is operated. In order to set the reset mode, the reset button 82 is disposed at the input IF 8 serving as an example of a user input/output unit 83 (see FIG. 9A). The reset button 82 functions as an example of a reset mode setting unit.

Database Input/Output Unit 45

The database input/output unit 45 inputs and outputs data (information) between the operation information database 44, the control information database 42, the force detecting unit 50, the gripping force detecting unit 55, the force determining unit 51, the control information setting unit 20, the master hand controlling unit 22, the slave hand controlling unit 32, and the operation information generating unit 53.

Information about the force detected by the force detecting unit 50, information about the gripping force detected by the gripping force detecting unit 55, information about the position of the master mechanism 29, information about the opening and closing amount of the opening and closing operation unit 12 (angle information), information about the position of the opening and closing operation unit 12, generated position information about the slave robot 2 and generated angle information about the hand mechanism 4, provided by the operation information generating unit 53, force information (generated force information) related to a force and provided by the operation information generating unit 53, gripping force information (generated gripping force information) related to a gripping force and provided by the operation information generating unit 53, and determination results provided by the force determining unit 51 are provided every set time (such as every 1 msec) using the timer 43A. These pieces of generated information are, along with the time, output to and stored as operation information in the operation information database 44 via the database input/output unit 45.

Operation Information Database 44

FIG. 13A illustrates an example of the contents of the information in the operation information database 44.

(1) The "time" column provides information about the time when the master slave apparatus 100 is operating. In the first embodiment, the time is in milliseconds (msec).

(2) The "force" column provides information about the force detected by the force detecting unit 50. In the first embodiment, force in an insertion direction and a translational-motion direction is in newtons (N), and force in a rotational direction is in newton meters (Nm).

(3) The "gripping force" column provides information about the gripping force detected by the gripping force detecting unit 55. In the first embodiment, the gripping force is in newtons (N).

(4) The "master position" column provides the position and orientation of the master mechanism 29 detected by, for example, an encoder (not shown) of the master mechanism 29. In the first embodiment, the position is in meters (m), and the orientation is in radians (rad).

Figure 14:
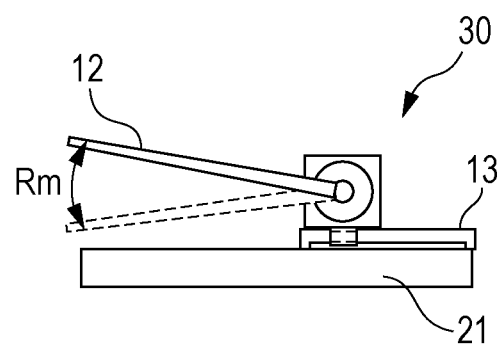
FIG. 14 illustrates an angle of an opening and closing operation unit in the first embodiment of the present disclosure.

(5) The "angle of opening and closing operation unit" column provides the angle of operation (opening and closing amount) of the opening and closing operation unit 12. More specifically, the angle of operation corresponds to an opening and closing amount (opening angle) Rm, which is the difference between an angle when the operation of the opening and closing operation unit 12 illustrated in FIG. 14 is started (corresponding to the angle formed by the solid-line opening and closing operation unit 12 illustrated in FIG. 14) and a present angle (corresponding to the angle formed by the dotted-line opening and closing operation unit 12 illustrated in FIG. 14). This difference corresponds to a relative angle. In the first embodiment, the angles are in radians (rad).

(6) The "position of opening and closing operation unit" column provides the position of the opening and closing operation 12 unit in a slide axis direction with respect to the slide unit 13. In the first embodiment, the position is in meters (m).

(7) The "slave position" column provides the position and orientation of the slave mechanism 41 that are detected by, for example, an encoder of the slave mechanism 41. In the first embodiment, the position is in meters (m), and the orientation is in radians (rad).

Figure 15:
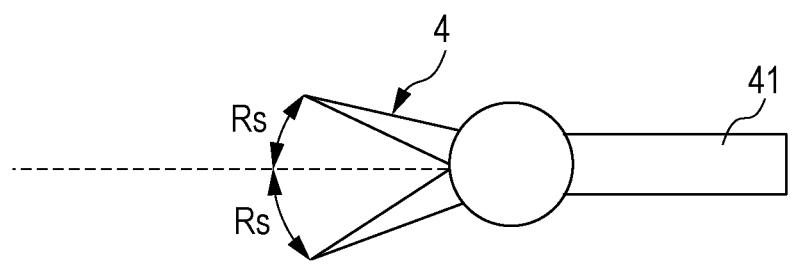
FIG. 15 illustrates an angle of the hand mechanism in the first embodiment of the present disclosure.

(8) The "hand angle" column provides the opening angle from the state in which the pair of opening and closing members 4a and 4b of the hand mechanism 4 are closed. More specifically, the opening angle corresponds to an opening angle Rs of each of the opening and closing members 4a and 4b from the closed state (dotted line in FIG. 15) illustrated in FIG. 15. In the first embodiment, each angle is in radians (rad).

(9) The "force after generation" column provides the information about the force provided by the operation information generating unit 53 (generated force information). In the first embodiment, force in an insertion direction and a translational-motion direction is in newtons (N), and force in a rotational direction is in newton meters (Nm).

(10) The "gripping force after generation" column provides information about gripping force provided by the operation information generating unit 53 (generated gripping force information). In the first embodiment, the gripping force is in newtons (N).

(11) The "determination result" column provides the determination result provided by the force determining unit 51. "0" indicates that load is not exerted, and "1" indicates that a load is exerted.

Control Information Database 42

Information about a mode that is set by the control information setting unit 20 and that has been switched between the movement mode and the reset mode is stored in the control information database 42 by the control information setting unit 20 via the database input/output unit 45.

The control information setting unit 20 causes information about the movement gain, the hand angle gain, the force gain, and the gripping force gain to be stored in the control information database 42. The movement gain is gain at the slave robot 2 when the master robot 3 is operated. The hand angle gain is gain of the hand mechanism 4 when the opening and closing operation unit 12 is operated. The force gain is gain that is provided when the generated force information is provided on the basis of the force detected by the force detecting unit 50. The gripping force gain is gain that is provided when the generated gripping force information is provided on the basis of the gripping force detected by the gripping force detecting unit 55.

FIG. 13B illustrates an example of the contents of the information in the control information database 42.

(1) In the "control mode of opening and closing operation unit" column, when the opening and closing operation unit 12 is slid (moved) with respect to the slide unit 13, "0" is stored in the case of the reset mode, and "1" is set in the case of the movement mode.

(2) In the "movement gain" column, information about the movement gain when the slave mechanism 41 of the slave robot 2 is controlled on the basis of the position and orientation of the master mechanism 29 of the master robot 3 is stored. When the slave mechanism 41 of the slave robot 2 is a six-axis arm, information about the movement gain for a total of six axes (three axes in the positional directions and three axes in the orientation directions) is stored.

(3) In the "hand angle gain" column, information about gain when the pair of opening and closing members 4a and 4b of the hand mechanism 4 are opened and closed on the basis of the angle provided when the opening and closing operation unit 12 is opened and closed is stored.

(4) In the "force gain" column, information about force gain when the force measured by the force measuring device 1 is transmitted to the master mechanism 29 is stored. When the force measuring device 1 is a six-axis sensor, information about the force gain for a total of six axes (three axes in the positional directions and three axes in the orientation directions) is stored.

(5) In the "gripping force gain" column, information about gripping force gain is stored. The gripping force gain is gain when feeding back to the opening and closing operation unit 12 gripping force that is generated when the opening and closing operation unit 12 is opened and closed.

Master Hand Controlling Device 23

The master hand controlling unit 23 includes the master hand controlling unit 22, the control information setting unit 20, the timer 43B, the operation information generating unit 53, and the output unit 97. The master hand controlling unit 22 controls the master mechanism 29 and the hand operation mechanism 30. The control information setting unit 20 sets the control information. The timer 43B inputs time information into the master hand controlling unit 22. The operation information generating unit 53 generates operation information about the slave robot 2 (generated position information and generated angle information). The output unit 97 outputs to the slave mechanism 41 operation information including the angle of a pair of opening and closing members 4a and 4b of the hand mechanism 4. The master hand controlling device 23 is such that, under control of the master hand controlling unit 22, operation information for operating the hand mechanism 4 (generated position information and generated angle information) is output from the output unit 97 to the slave hand controlling mechanism 31 at the slave mechanism on the basis of the angle of the pair of opening and closing operation unit 12 or the position of the opening and closing operation unit at the slide unit 13.

Information is transmitted between the master mechanism 29 and the master hand controlling device 23. More specifically, position information from the master mechanism 29 is output to the master hand controlling unit 22 from the master mechanism 29. Using the timer 43B, at every given time (such as every 1 msec), the position information from the master hand controlling unit 22 is output to the master mechanism 29 from the master hand controlling unit 22, and the operation of the master mechanism 29 is controlled. The master hand controlling unit 22 operates a motor (not shown) in the master mechanism 29 in accordance with the position information from the master mechanism 29. The rotational angle of the motor (not shown) in the master mechanism 29 is detected by, for example, an encoder (not shown), and feedback control is performed at the master hand controlling unit 22.

Information is also transmitted between the hand operation mechanism 30 and the master hand controlling device 23. More specifically, information about the angle of operation of the opening and closing operation unit 12 of the hand operation mechanism 30 (opening and closing amount information) and information about the position of the opening and closing operation unit 12 with respect to the slide unit 13 are output to the master hand controlling unit 22 from the hand operation mechanism 30. Using the timer 43B, at every set time (such as every 1 msec), angle information and gripping force information from the master hand controlling unit 22 are output to the hand operation mechanism 30, and the operation of the hand operation mechanism 30 is controlled. The master hand controlling unit 22 operates the motor 18 of the hand operation unit 30 (see FIG. 2B) in accordance with the angle information and the gripping force information from the master hand controlling unit 22.

That is, the master hand controlling device 23 outputs (i) the information about the position of the master mechanism 29, (ii) the information about the angle of the opening and closing operation unit 12, and (iii) the information about the position of the opening and closing operation unit 12 with respect to the slide unit 13 to the slave hand controlling device 31 at every predetermined time (such as every 1 msec).

The slave hand controlling device 31 transmits force to the operator 11 on the basis of gripping force information or force information input to the slave hand controlling device 31 from the operation information database 44 and a control mode stored in the control information database 42. Force may be transmitted to the operator 11 by, for example, increasing and decreasing a load exerted upon fingers of the operator 11 by forwardly and reversely rotating the opening and closing operation unit 12 as a result of driving the motor 18 of the hand operation mechanism 30.

After passage of a given time (such as every 1 msec), the timer 43B outputs an instruction for causing the master hand controlling unit 22 to perform an operation to the master hand controlling unit 22.

Slave Hand Controlling Device 31

The slave hand controlling device 31 includes the slave hand controlling unit 32 and a timer 43C. The slave hand controlling unit 32 controls the operation of the hand mechanism 4 and the slave mechanism 41. The timer 43C inputs time information to the slave hand controlling unit 32. The slave hand controlling unit 32 receives operation information (generated information) for operating the hand mechanism 4 from the master hand controlling unit 22 via the output unit 97, and separately controls the operation of the slave mechanism 41 and the hand mechanism 4 on the basis of the operation information (generated information).

Information is also transmitted between the slave mechanism 41 and the slave hand controlling device 31. More specifically, position information from the slave hand controlling unit 32 is output to the slave mechanism 41 from the slave hand controlling unit 32. Using the timer 43C, at every given time (such as every 1 msec), the position information from the slave mechanism 41 is output to the slave hand controlling unit 32 from the slave mechanism 4, and the operation of the slave mechanism 41 is controlled. The position information from the slave mechanism 41 is output as operation information for controlling the slave mechanism 41. The slave hand controlling unit 32 operates a motor (not shown) of the slave mechanism 41 in accordance with the position information input from the slave hand controlling unit 32. The rotational angle of the motor (not shown) in the slave mechanism 41 is detected by, for example, an encoder (not shown), and feedback control is performed at the slave hand controlling unit 32.

Information is also transmitted between the hand mechanism 4 and the slave hand controlling device 31. More specifically, angle information from the slave hand controlling unit 32 is output to the hand mechanism 4 from the slave hand controlling unit 32. Using the timer 43C, at every given time (such as every 1 msec), the angle information from the hand mechanism 4 is output to the slave hand controlling unit 32 from the hand mechanism 32, and the operation of the hand mechanism 4 is controlled. The angle information from the hand mechanism 4 is output as operation information for controlling the hand mechanism 4. The slave hand controlling unit 31 controls the operation of the motor 71a of the hand mechanism 4 (see FIG. 4B) in accordance with the angle information from the slave hand controlling unit 32.

That is, the slave hand controlling device 31 causes generated position information about the position of the slave mechanism 41 and generated position information about the angle of the hand mechanism 4 to be provided by the operation information generating unit 53, on the basis of the information about the position of the master mechanism 29, the information about the angle of the opening and closing operation unit 12, and the position of the opening and closing operation unit 12 with respect to the slide unit 13, stored in the operation information database 44, and the information in the control information database 42. Further, the slave hand controlling device 31 causes the slave mechanism 41 and the hand mechanism 4 to be in accordance with the generated position information and the generated angle information provided by the operation information generating unit 53. In addition, on the basis of the information in the control information database and the gripping force information and the force information acquired by the force measuring device, the slave hand controlling device 31 causes the generated force information and the generated gripping force information to be provided by the operation information generating unit 53, and outputs the generated force information and the generated gripping force information that have been provided to the master hand controlling device 23 via the slave hand controlling unit 32.

After the passage of a given time (such as every 1 msec), the timer 43C outputs an instruction for causing the slave hand controlling device 31 to perform an operation to the slave hand controlling device 31.

Operation Information Generating Unit 53

The operation information generating unit 53 generates the information about the position of the slave mechanism 41 and the information about the angle of the hand mechanism 4 (the generated position information and generated angle information) on the basis of the information about the position of the master mechanism 29, the information about the angle of the opening and closing operation unit 12, the information about the position of the opening and closing operation unit 12 with respect to the slide unit 13, stored in the operation information database 44, and the information in the control information database 42. In addition, the operation information generating unit 53 provides the generated force information related to a force and the generated gripping force information related to a gripping force, which are measured by the force measuring device 1, on the basis of the information in the operation information database 44 and the information in the control information database 42.

The operation information generating unit 53 causes the generated position information, the generated angle information, the generated force information, and the generated gripping force information, provided by the operation information generating unit 53, to be stored in the operation information database 44 via the database input/output unit 45.

When the control mode in the control information database 42 is the movement mode, a value obtained by multiplying the movement gain in the control information database to the information about the position of the master mechanism 29 is generated by the operation information generating unit 53 as the generated position information related to the position of the slave mechanism 41. More specifically, when the amount of change in the position of the master mechanism 29 at a time $t_1$ is ($\Delta pm_{x1}$, $\Delta pm_{y1}$, $\Delta pm_{z1}$, $\Delta pm_{\phi1}$, $\Delta pm_{\theta1}$, $\Delta pm_{\psi1}$) and the movement gain is ($gm_x$, $gm_y$, $gm_z$, $gm_\phi$, $gm_\theta$, $gm_\psi$), the operation information generating unit 53 generates values ($gm_x \times \Delta pm_{x1}$, $gm_y \times \Delta pm_{y1}$, $gm_z \times \Delta pm_{z1}$, $gm_\phi \times \Delta pm_{\phi1}$, $gm_\theta \times \Delta pm_{\theta1}$, $gm_\psi \times \Delta pm_{\psi1}$) as target positions (generated position information) after the movement of the slave robot 2 from the present position.

The operation information generating unit 53 provides the generated force information detected by the force detecting unit 50, with a value obtained by multiplying the force gain in the control information database 42 being force information after the generation thereof. More specifically, when the force at a time $t_1$ is $fs_1 = (fs_{x1}, fs_{y1}, fs_{z1}, fs_{\phi1}, fs_{\theta1}, fs_{\psi1})$ and the force gain is $gfs = (gfs_x, gfs_y, gfs_z, gfs_\phi, gfs_\theta, gfs_\psi)$, the force information after the generation thereof corresponds to $gfs \times fs_1$. Therefore, the operation information generating unit 53 generates values ($gfs_x \times fs_{x1}$, $gfs_y \times fs_{y1}$, $gfs_z \times fs_{z1}$, $gfs_\phi \times fs_{\phi1}$, $gfs_\theta \times fs_{\theta1}$, $gfs_\psi \times fs_{\psi1}$) as the force information after the generation thereof.

A value obtained by multiplying the gripping force gain in the control information database 42 to the gripping force detected by the gripping force detecting unit 55 is generated by the operation information generating unit 53 as generated gripping force information. More specifically, when the gripping force at a time t1 is $fh_1$, and the gripping force gain is gfh, the operation information generating unit 53 generates the gripping force information after the generation thereof as a value obtained by $gfh \times fh_1$.

Figure 16A:
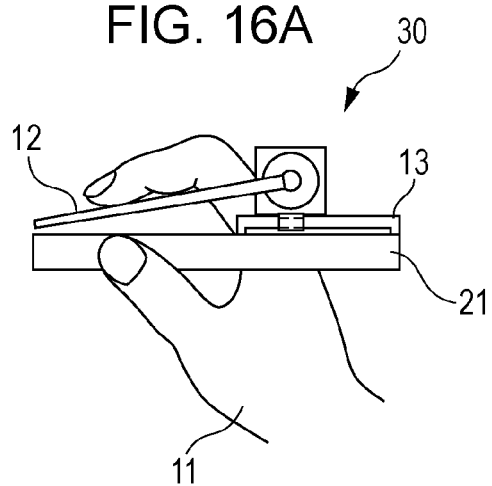
FIG. 16A illustrates an operation of the hand operation mechanism in the first embodiment of the present disclosure.
Figure 16B:
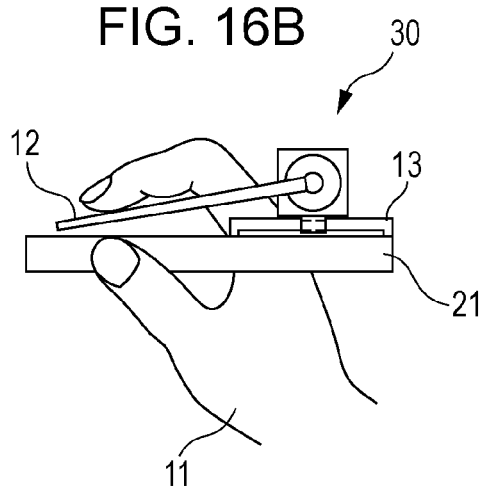
FIG. 16B illustrates an operation of the hand operation mechanism in the first embodiment of the present disclosure.

In the master apparatus 80 for the master slave apparatus according to the first embodiment, the operator 11 is provided with the following operational feeling. That is, as an operation of the slide unit 13, the operator 11 is provided with an operational feeling like that provided when the gripping position of tweezers is changed. More specifically, as illustrated in FIG. 16A, when the opening and closing operation unit 12 is gripped with the opening and closing operation unit 12 being slid up to a front position with respect to the slide unit 13, as illustrated in FIG. 17A, the operator 11 is provided with an operational feeling like that provided when a back portion of the tweezers 54 is gripped with the fingers. Similarly, as illustrated in FIG. 16B, when the opening and closing operation 12 is gripped with the opening and closing operation unit 12 being slid to a position situated rearwardly from the position in FIG. 16A with respect to the slide unit 13, as illustrated in FIG. 17B, the operator 11 is provided with an operational feeling like that provided when a portion of the tweezers 54 situated forwardly from the gripped portion in FIG. 17A is gripped. When the opening and closing operation unit 12 is gripped with the opening and closing operation unit 12 being slid further rearward as illustrated in FIG. 16C with respect to the slide unit 13, as illustrated in FIG. 17C, the operator 11 is provided with an operational feeling like that provided when the tips of the tweezers 54 are gripped with the fingers.

In order to provide the operational feelings described above, in accordance with the position of the opening and closing operation unit 12 with respect to the slide unit 13, one or more of the movement gain, the hand angle gain, the force gain, and the gripping force gain in the control information database 42 are corrected by the operation information generating unit 53.

Figure 16C:
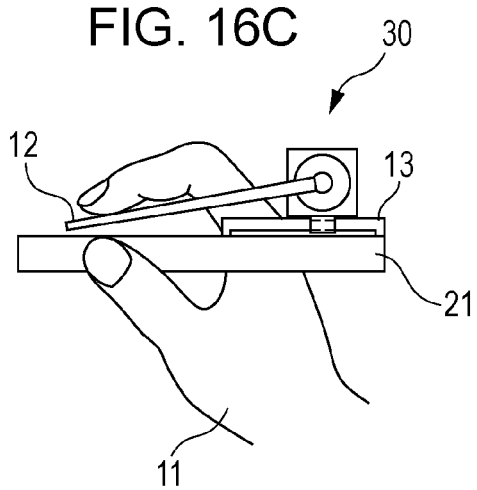
FIG. 16C illustrates an operation of the hand operation mechanism in the first embodiment of the present disclosure.
Figure 17A:
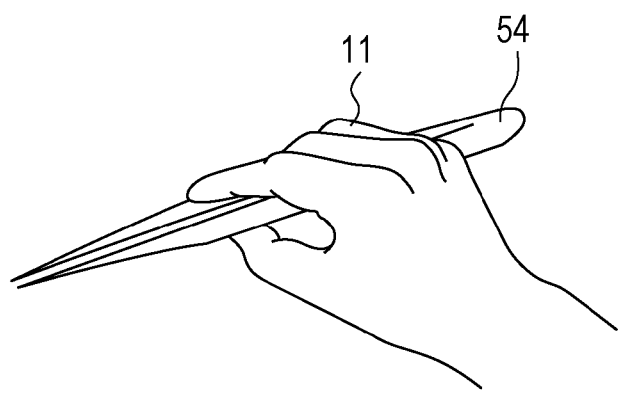
FIG. 17A illustrates an operation of tweezers in the first embodiment of the present disclosure.
Figure 17B:
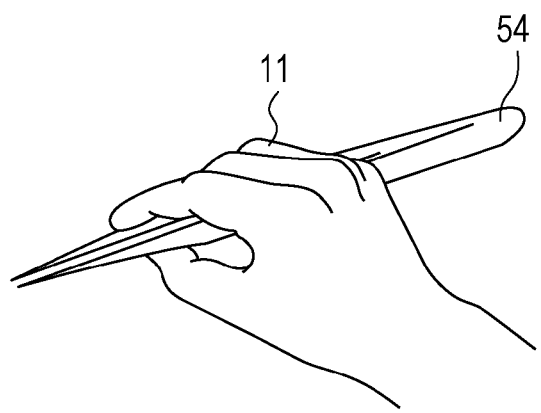
FIG. 17B illustrates an operation of the tweezers in the first embodiment of the present disclosure.
Figure 17C:
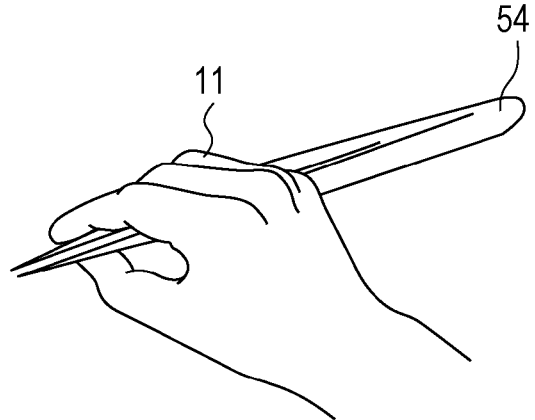
FIG. 17C illustrates an operation of the tweezers in the first embodiment of the present disclosure.

More specifically, when, as illustrated in FIG. 16B or 16C, the opening and closing operation unit is moved rearward from the position of the opening and closing operation unit in FIG. 16A (that is, when the opening and closing operation unit is moved rearward from the position at that time), the operation information generating unit 53 sets the movement gain and the hand angle gain in the control information database 42 so as be become small values. That is, when the position of the opening and closing operation unit is moved rearward with respect to the slide rail 13a, the tips of the tweezers 54 are gripped and operated. Therefore, when the operation information generating unit 53 sets the movement gain and the hand angle gain to small values, delicate operations are facilitated. As an example, with a default movement gain being previously determined, when the opening and closing operation unit is moved rearward, the operation information generating unit 53 sets the movement gain smaller than the default movement gain, whereas, when the opening and closing operation unit is moved forward, the operation information generating unit 53 sets the movement gain larger than the default movement gain. As another example, the movement gain that is set by the operation information generating unit 53 may be set smaller than the movement gain that is already being used when being set by the operation information generating unit 53.

When the position of the opening and closing operation unit 12 is moved to a rear end on the slide unit 13, it is necessary to, with the reset mode being set and the control operation being temporarily stopped, move the position of the opening and closing operation unit 12 forward on the slide unit 13, and, then, with the movement mode being set, move the position of the opening and closing operation unit 12 rearward on the slide unit 13.

As regards the force gain and the gripping force gain, when the position of the opening and closing operation unit 12 is moved rearward, in order to facilitate transmission of force, the force gain and the gripping force gain are set to large values by the operation information generating unit 53. In contrast, when the position of the opening and closing operation unit 12 is moved forward, in order to make it difficult to transmit the force, the force gain and the gripping force gain are set to small values by the operation information generating unit 53.

As an example, with a default force gain and a default gripping force gain being previously determined, when the position of the opening and closing operation unit 12 is moved rearward, the operation information generating unit 53 sets the default force gain and the default gripping force gain to larger values, whereas, when the position of the opening and closing operation unit 12 is moved forward, the operation information generating unit 53 sets the default force gain and the default gripping force gain to smaller values. As another example, the movement gain that is set by the operation information generating unit 53 may be set larger than the force gain and the gripping force gain that are already being used when being set by the operation information generating unit 53.

More specifically, when the position of the opening and closing operation unit 12 in FIG. 16A is 0 and an absolute value of the amount of change in the position of the opening and closing operation unit 12 from the position in FIG. 16A when the opening and closing operation unit 12 moves backward is $\Delta lm$, a corrected movement gain $gm_{new}$ is calculated by the operation information generating unit 53 with the corrected movement gain $gm_{new}$ being equal to a movement gain $gm_{old}$ before the correction$-\alpha\Delta lm$. However, $\alpha$ is a constant and is set by the operation information generating unit 53 so that $\alpha \times \Delta lm$ does not exceed the movement gain $gm_{old}$ before the correction. A corrected hand angle gain $grm_{new}$ is calculated by the operation information generating unit 53 with the corrected hand angle gain $grm_{new}$ being equal to a hand angle gain $grm_{old}$ before the correction$-\beta \times \Delta lm$. However, $\beta$ is a constant and is set by the operation information generating unit 53 so that $\beta \times \Delta lm$ does not exceed $grm_{old}$. A corrected force gain $gfs_{new}$ is calculated by the operation information generating unit 53 with the corrected force gain $gfs_{new}$ being equal to a force gain $gfs_{old}$ before the correction$+\gamma \times \Delta lm$. However, $\gamma$ is a constant and is set by the operation information generating unit 53 so that $\gamma \times \Delta lm$ does not exceed the corrected force gain $gfs_{new}$. A corrected gripping force gain $gfh_{new}$ is calculated by the operation information generating unit 53 with the corrected gripping force gain $gfh_{new}$ being equal to a gripping force gain $gfh_{old}$ before correction$+\omega \times \Delta lm$. However, $\omega$ is a constant and is set by the operation information generating unit 53 so that $\omega \times \Delta lm$ does not exceed the corrected gripping force gain $gfh_{new}$. On the basis of the movement gain, the hand angle gain, the force gain, and the gripping gain, calculated in this way, using a method that is similar to that used when the control mode in the control information database 42 is the movement mode, the operation information generating unit 53 provides the generated position information about the slave mechanism 41, the generated angle information about the hand mechanism 4, the generated force information, and the generated gripping force information, and causes these pieces of information to be stored in the operation information database 44 via the database input/output unit 45.

Figure 18:
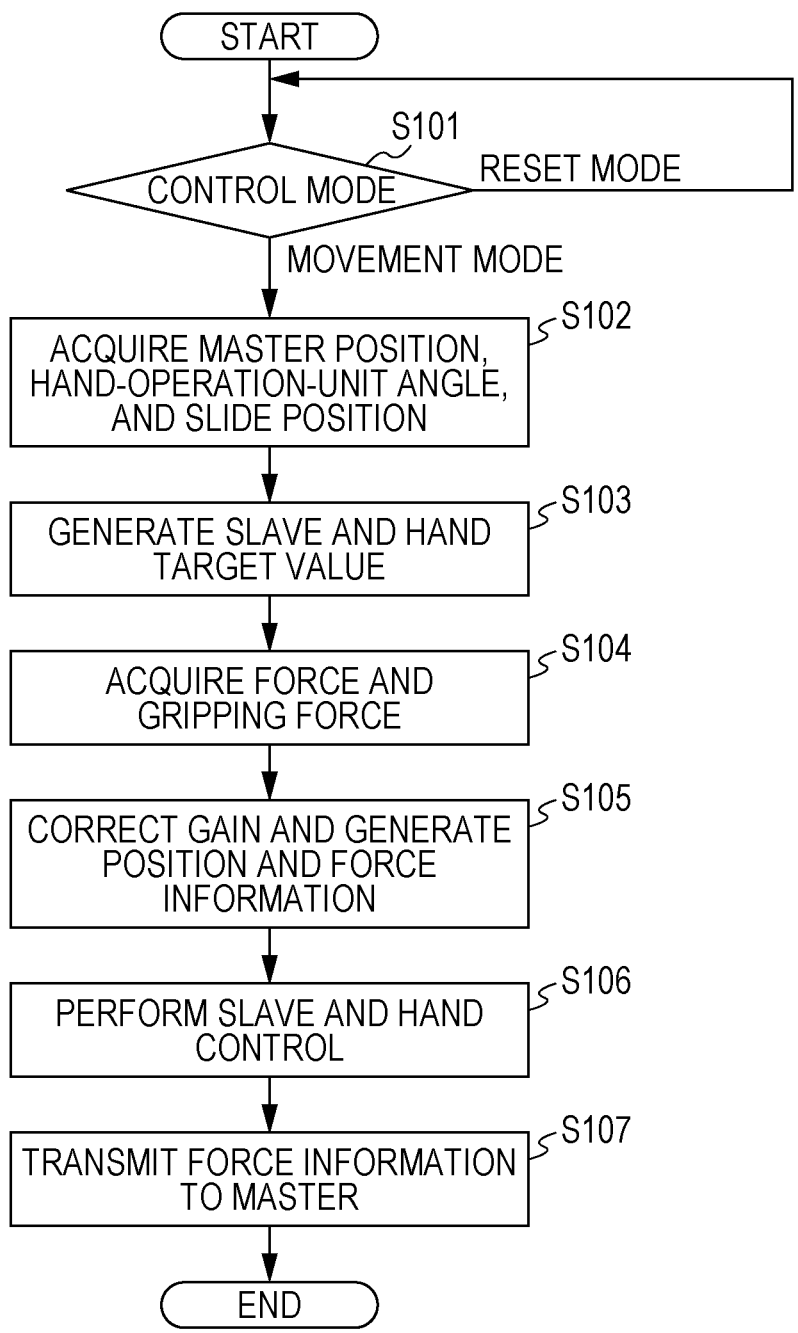
FIG. 18 is a flowchart for the master slave apparatus in the first embodiment of the present disclosure.

The procedure for operating the master slave apparatus 100 according to the first embodiment is hereunder described with reference to the flowchart of FIG. 18. FIG. 18 describes the procedure for transmitting force that is exerted upon the part 5 and gripping force that is generated when the part 5 is gripped to the master robot 3 in a case where the operator 11 operates the master robot 3 to operate the slave robot 2, and inserts the part 5 gripped by the hand mechanism 4 into the insertion opening 6.

First, in Step S101, when the operation information generating unit 53 refers to the control information database 42 via the database input/output unit 45, and the control mode in the control information database 42 is the movement mode, the process proceeds to Step S102, whereas when the control mode is the reset mode, the process returns to Step S101.

Next, in Step S102, via the database input/output unit 45, the master hand controlling device 23 acquires information about the position of the master mechanism 29 when the master mechanism 29 has moved, information about the angle of the opening and closing operation unit 12 of the hand operation mechanism 30, and information about the position of the opening and closing operation unit 12 with respect to the slide unit 13, and causes these pieces of information to be stored in the operation information database 44.

Next, in Step S103, the operation information generating unit 53 provides generated position information (target value) related to the position of the slave mechanism 41 and generated angle information (target value) related to the angle of the hand mechanism 4, on the basis of the information about the position of the master mechanism 29, the information about the angle of the opening and closing operation unit 12, and the information about the position of the opening and closing operation unit 12 with respect to the slide unit 13, stored in the operation information database 44, and the information in the control information database 42.

Next, in Step S104, the force measuring device 1 acquires force information about a force generated when the slave robot 2 is connected to an external object and gripping force information about a gripping force generated when the hand mechanism 4 grips the part 5.

Next, in Step S105, the operation information generating unit 53 corrects a gripping force gain, a force gain, a hand angle gain, and a movement gain already being used when being set, and provides generated position information about the slave mechanism 41, generated angle information about the hand mechanism 4, generated force information, and generated gripping force information.

Next, in Step S106, the slave mechanism 41 and the hand mechanism 4 are separately controlled on the basis of the generated position information and the generated angle information provided in Step S105.

Next, in Step S107, forces are separately fed back to the master mechanism 29 and the hand operation mechanism 30 on the basis of the generated force information and the generated gripping force information provided in Step S105. Then, Step S107 ends.

The acquiring operation in Step S102 and the generating operation in Step S103 may be simultaneously performed, or may be performed in the reverse order. The acquiring operation in Step S104 and the generating operation in Step S105 may be simultaneously performed, or may be performed in the reverse order.

Advantages of First Embodiment

As mentioned above, when the master robot 3 includes the opening and closing operation unit 12 and the slide unit 13 as the hand operation mechanism 30, and the opening and closing operation unit 12 is slid (moved) with respect to the slide unit 13, the operator 11 is provided with an operational feeling like that provided when the gripping position of the tweezers 54 is changed. That is, a value that is close to a value of a force that a hand of the operator 11 feels when operating the hand mechanism 4, such as the tweezers or the grip unit 21, provided at the slave mechanism 41, while changing the gripping position of the hand mechanism 4 can be fed back to the hand of the operator 11 from the master mechanism 29. As a result, it is possible to feel a force like that which is felt when the gripping position of the tweezers or the grip unit has changed. Further, it is possible to stably operate the hand operation mechanism 30 by gripping the grip unit 21 and the opening and closing operation unit 12 from therebelow.

Second Embodiment

In a second embodiment of the present disclosure, a grip unit 21 is provided with a rotating mechanism 24 that rotates a hand operation mechanism 30, so that a mode for opening and closing an opening and closing operation unit 12 with an index finger 11b (hereunder referred to as a T mode) can be changed to a mode for opening and closing the opening and closing operation unit 12 with a thumb 11a (hereunder referred to as a B mode).

The details are described below.

Figure 19A:
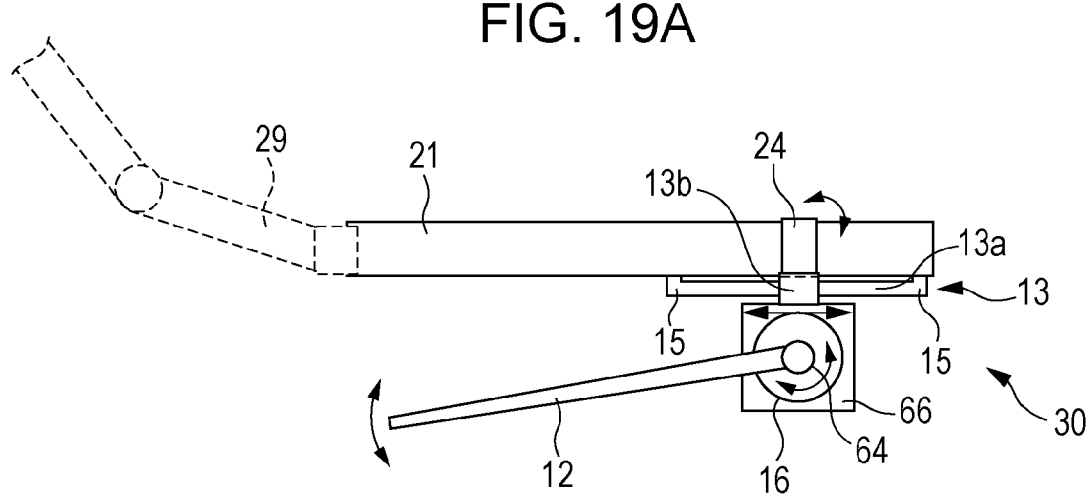
FIG. 19A is a top plan view of a hand operation mechanism at a master side in a second embodiment.
Figure 19B:
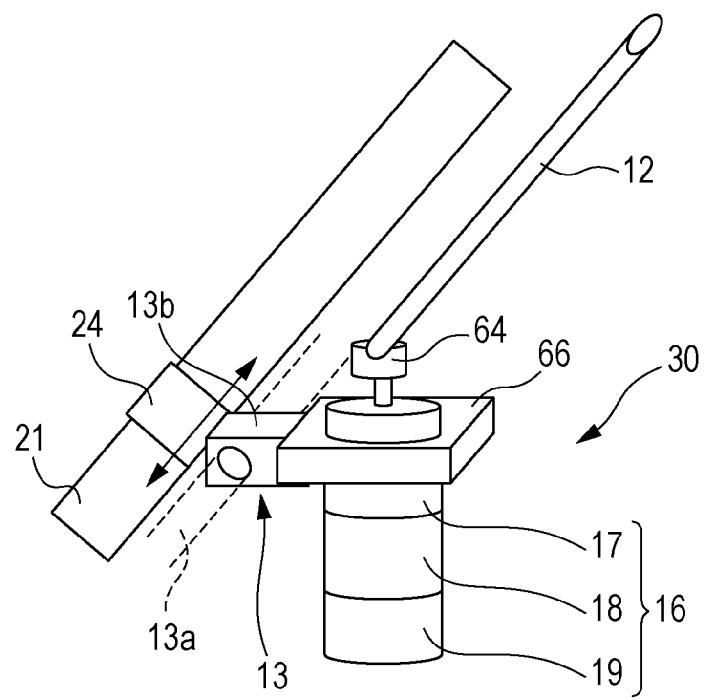
FIG. 19B is an oblique transverse perspective view of the hand operation mechanism at the master side in the second embodiment.

FIG. 19A is a top plan view of the hand operation mechanism 30 at a master side in the second embodiment. FIG. 19B is an oblique transverse perspective view of the hand operation mechanism 30.

A slide rail 13a, stoppers 15, a motor bearing unit 64, a master motor unit 16, and the opening and closing operation unit 12 are the same as those according to the first embodiment. Therefore, they are not described.

Figure 20A:
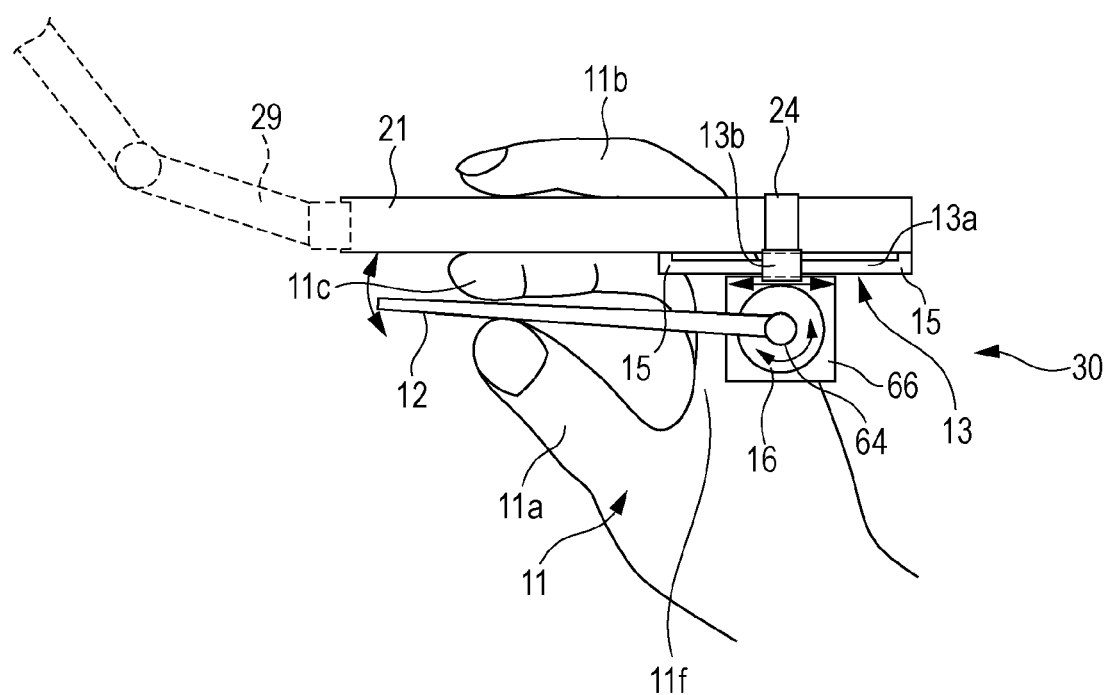
FIG. 20A is a plan view of a hand operation mechanism gripped by an operator in the second embodiment.

FIG. 20A is a plan view of the hand operation mechanism 30 gripped by an operator 11. FIGS. 20B and 20C are each a sectional view of the rotating mechanism 24.

The rotating mechanism 24 is a mechanism that rotates a slide unit 13 and the opening and closing operation unit 12 with respect to the grip unit 21 around an axis in a longitudinal direction of the grip unit 21. More specifically, the rotating mechanism 24 includes a cylindrical member rotatably fitted to an outer peripheral surface of the grip unit 21. As illustrated in FIGS. 20B and 20C, an inner surface of the cylindrical member includes a first groove 25A and a second groove 25B at 180-degree rotation phase positions; and a first fixed electrode 25C and a second fixed electrode 25D are disposed at inner surfaces of the grooves 25A and 25B, respectively. A flexible protruding stopper 26 is fixed to one location of the outer peripheral surface of the grip unit 21 so as to be capable of opposing the first groove 25A and the second groove 25B. The stopper 26 is selectively fittable to the first groove 25A and the second groove 25B. A movable electrode 25E is disposed at a surface of the stopper 26. Therefore, when the stopper 26 is fitted to the first groove 25A, the movable electrode 25E contacts the first fixed electrode 25C, and the T mode is detectable. On the other hand, when the stopper 26 is fitted to the second groove 25B, the movable electrode 25E contacts the second fixed electrode 25D, and the B mode is detectable. Therefore, the movable electrode 25E, the first fixed electrode 25C, and the second fixed electrode 25D form a rotating mechanism position detecting unit 25F.

Instead of the flexible protruding stopper 26, it is possible to use a protruding stopper 26 that is normally urged in a protruding direction by an urging member, such as a spring, and that has the following structure. In the structure, at a position that does not oppose the first groove 25A or the second groove 25B, the surface of the stopper 26 is in a state in which it can contact the outer peripheral surface of the grip unit 21 by an urging force of the urging member; and, at a position that opposes the first groove 25A or the second groove 25B, the surface of the stopper 26 is fitted to the first groove 25A or the second groove 25B by an urging force of the urging member.

Therefore, after the operator 11 has rotated the slide unit 13 and the opening and closing operation unit 12, along with the rotating mechanism 24, around the grip unit 21, the slide unit 13, the opening and closing operation unit 12, and the rotating mechanism 24 are fixed with respect to the grip unit 21 at a T-mode position in FIG. 3 or a B-mode position in FIG. 20A.

In a different exemplary structure of the rotating mechanism 24, a screw or the like may be used; or a member including a ratchet may be used to allow the stopper to be fixed even to a portion other that the first groove 25A or the second groove 25B and the mode to be changed in multiple steps.

The slide rail 13a and an operating-unit supporting section 13b have the same structures as those in the first embodiment. Therefore, the slide rail 13a is made movable in the operating-unit supporting section 13b, and the slide rail 13a is fixed to the operating-unit supporting section 13b so as to be immovable with respect to a slide axial direction by engaging the slide ratchet unit 68 with the slide bearing ratchet unit 69 as in the first embodiment.

One end of the grip unit 21 is connected to and disposed at an end portion of a robot arm serving as an example of a master mechanism 29. As an example, when, as illustrated in FIG. 20A, the operator 11 rotates the rotating mechanism 24 and fixes it at a B-mode position, the operator 11 pushes down the grip unit 21 with the index finger 11b, grips the grip unit 21 with a middle finger 11c so as to support the grip unit 21 from therebelow, and opens and closes the opening and closing operation unit 12 with a thumb 11a.

Figure 21A:
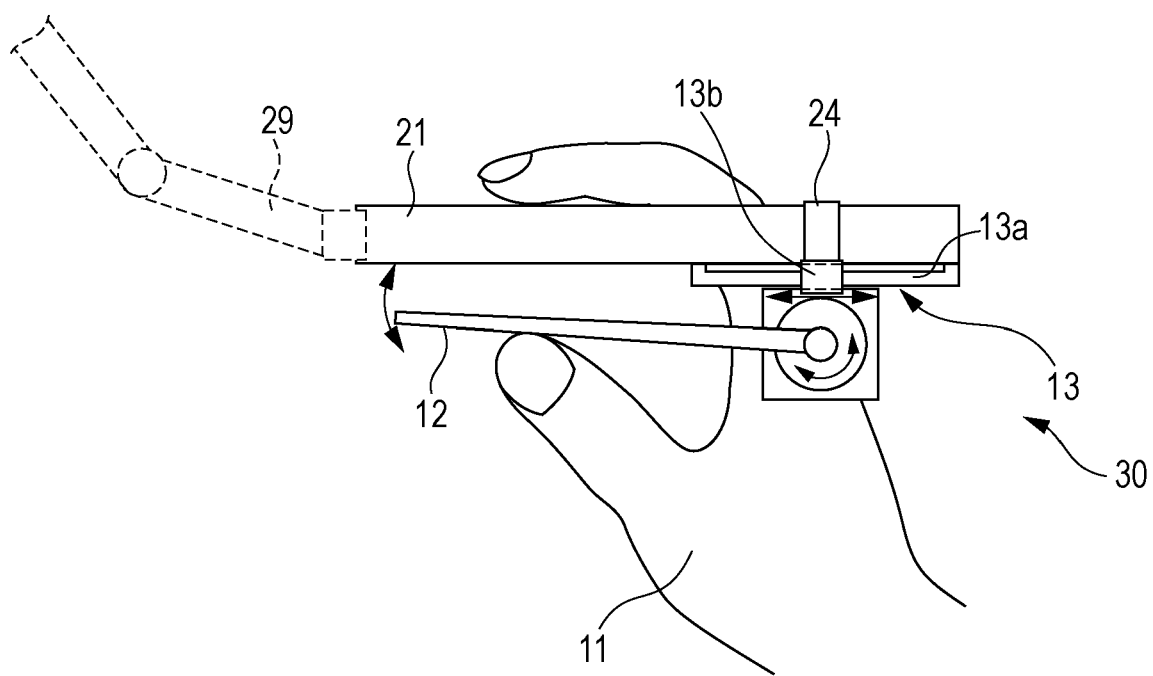
FIG. 21A illustrates an operation of a master mechanism in the second embodiment.
Figure 21B:
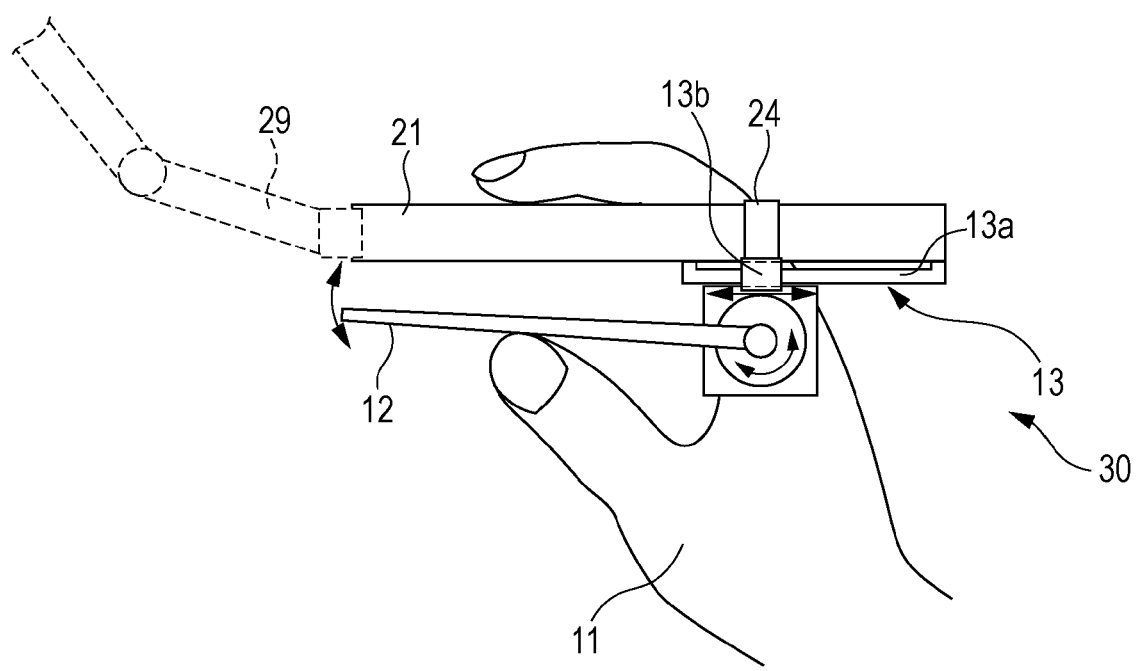
FIG. 21B illustrates an operation of the master mechanism in the second embodiment.
Figure 21C:
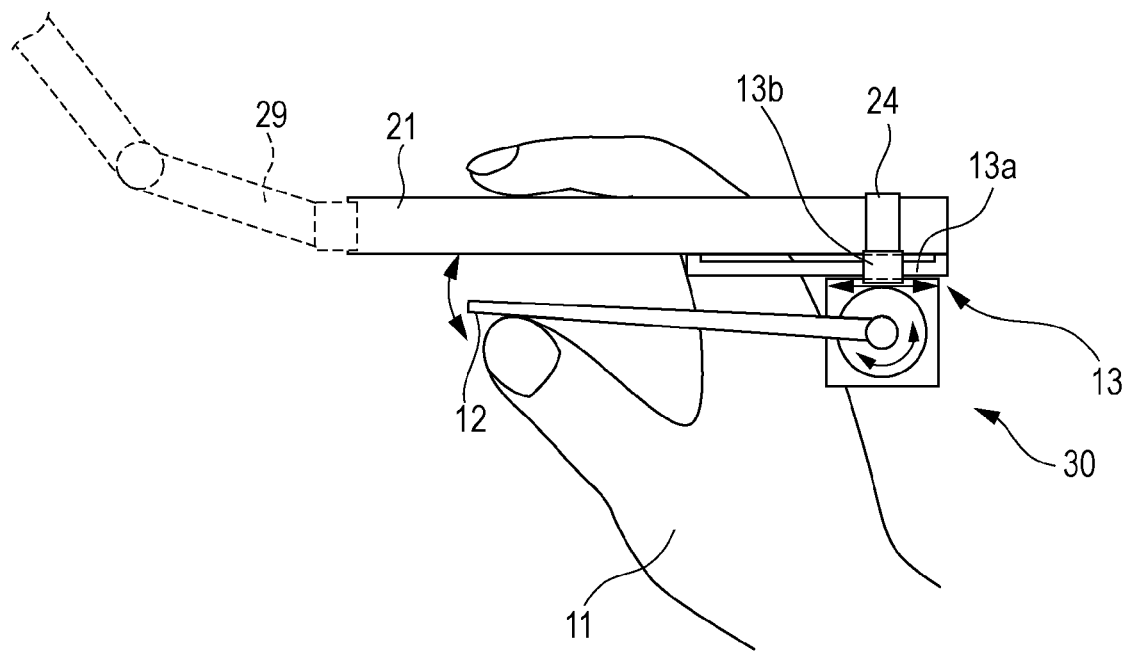
FIG. 21C illustrates an operation of the master mechanism in the second embodiment.

Since the movable area of the thumb 11a is narrower than that of the index finger 11b, when, as illustrated in FIG. 21C, the opening and closing operation unit 12 is moved backward with respect to the slide unit 13, it is difficult to open and close the opening and closing operation unit 12 with the thumb 11a. Therefore, when the opening and closing operation unit 12 is to be opened and closed with the thumb 11a, as illustrated in FIG. 21A or 21B, the opening and closing operation unit 12 is opened and closed by sliding it forward with respect to the slide unit 13, to make it possible to open and close the opening and closing operation unit 12 within the movable area of the thumb 11a.

In a control information setting unit 20, in addition to switching between the reset mode and the movement mode in the first embodiment, the T mode and the B mode are settable. When, as illustrated in FIG. 20B, the stopper 26 is fixed to the first groove 25A and the movable electrode 25E is in contact with the first fixed electrode 25C, the rotating mechanism position detecting unit 25F detects that the T mode is set, and outputs the detection result to the control information setting unit 20 (see the rotating mechanism position detecting unit 25F indicated by alternate long and short dashed lines in FIG. 9A). On the other hand, when the stopper 26 is fixed to the second groove 25B and the movable electrode 25E contacts the second fixed electrode 25D, the rotating mechanism position detecting unit 25F detects that the B mode is set, and outputs the detection result to the control information setting unit 20. As in the first embodiment, the reset mode is a reset mode that is set at the control information setting unit 20 by pressing a reset button 82. The reset mode is a mode in which, even if the opening and closing operation unit 12 or a master robot 3 is operated, a hand mechanism 4 and a slave robot 2 do not temporarily operate. When, in the control information setting unit 20, the T mode is set, movement mode operations that are the same as those according to the first embodiment are performed. When the B mode is set in the control information setting unit 20, and the slide unit 13 is moved backward to the position illustrated in FIG. 21C, even if the movement mode is set, the reset mode is set, so that operations that are the same as those in the reset mode are performed. That is, as illustrated in FIG. 21C, when the opening and closing operation unit 12 is moved backward, it becomes difficult to open and close the opening and closing operation unit 12 with the thumb 11a. Therefore, when the B mode is set by the control information setting unit 20, and the opening and closing operation unit 12 is moved backward with respect to the slide unit 13 to the position illustrated in FIG. 21C, the control information setting unit 20 prevents the opening and closing operation unit 12 from operating. When the opening and closing operation unit 12 is moved backward with respect to the slide unit 12 to the position illustrated in FIG. 21C, the opening and closing operation unit 12 is such as not to be operated by the control information setting unit 20. However, as in the first embodiment, when the opening and closing operation unit 12 is to be moved backward, if an operation information generating unit 53 sets the default force gain and the default gripping force gain to larger values, the hand mechanism 4 can be moved by a large amount by moving the opening and closing operation unit 12 only by a small amount.

Figure 22:
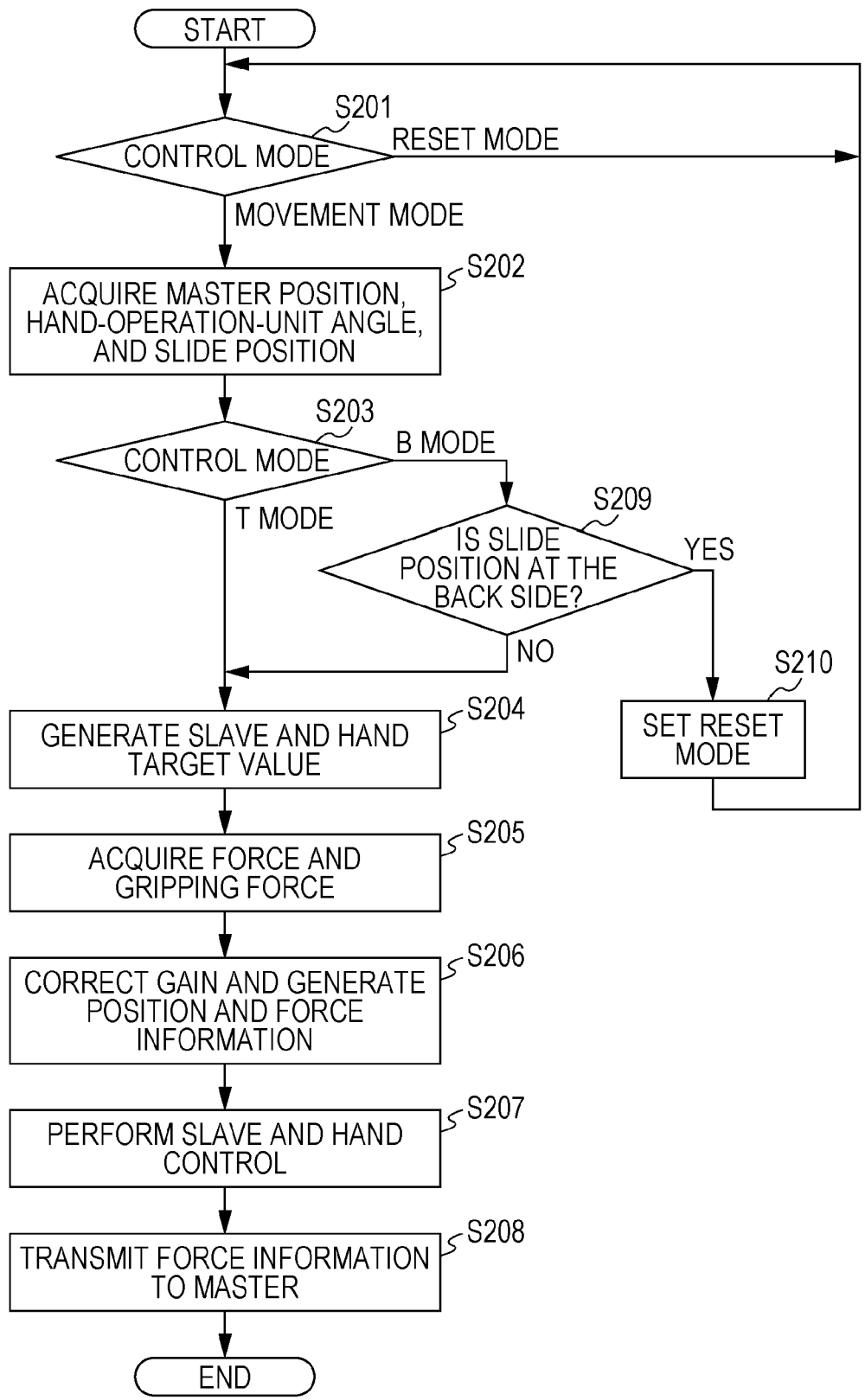
FIG. 22 is a flowchart of a master slave apparatus in the second embodiment of the present disclosure.

The procedure for operating the master slave apparatus 100 according to the second embodiment is hereunder described using the flowchart of FIG. 22. FIG. 22 describes the procedure for transmitting force that is exerted upon the part 5 and gripping force that is generated when the part 5 is gripped to the master robot 3 in a case where the operator 11 operates the master robot 3 to operate the slave robot 2, and inserts the part 5 gripped by the hand mechanism 4 into the insertion opening 6.

First, in Step S201, when the operation information generating unit 53 refers to a control information database 42 via an database input/output unit 45, and a control mode in the control information database 42 is the movement mode, the process proceeds to Step S202, whereas when the control mode is the reset mode, the process returns to Step S201.

Next, in Step S202, via the database input/output unit 45, a master hand controlling device 23 acquires information about the position of the master mechanism 29 when the master mechanism 29 has moved, information about the angle of the opening and closing operation unit 12 of the hand operation mechanism 30, and information about the position of the opening and closing operation unit 12 with respect to the slide unit 13, and causes these pieces of information to be stored in the operation information database 44.

Next, in Step S203, when the control mode is the T mode, the process proceeds to Step S204, whereas, when the control mode is the B mode, the process proceeds to Step S209.

Next, in Step S204, the operation information generating unit 53 provides generated position information (target value) related to the position of the slave mechanism 41 and generated angle information (target value) related to the angle of the hand mechanism 4, on the basis of the information about the position of the master mechanism 29, the information about the angle of the opening and closing operation unit 12, and the information about the position of the opening and closing operation unit 12 with respect to the slide unit 13, stored in the operation information database 44, and the information in the control information database 42.

Next, in Step S205, a force measuring device 1 acquires force information about a force generated when the slave robot 2 is connected to an external object and gripping force information about a gripping force generated when the hand mechanism 4 grips the part 5.

Next, in Step S206, the operation information generating unit 53 corrects a gripping force gain, a force gain, a hand angle gain, and a movement gain already being used when being set, and provides generated position information about the slave mechanism 41, generated angle information about the hand mechanism 4, generated force information, and generated gripping force information.

Next, in Step S207, the slave mechanism 41 and the hand mechanism 4 are separately controlled on the basis of the generated position information and the generated angle information provided in Step S205.

Next, in Step S208, forces are separately fed back to the master mechanism 29 and the hand operation mechanism 30 on the basis of the generated force information and the generated gripping force information provided in Step S205. Then, Step S208 ends.

In Step S203, when the control mode is the B mode, the process proceeds to Step S209. In Step S209, when the position of the opening and closing operation unit 12 is at the back side of the slide unit 13, the process proceeds to Step S210, whereas, when the position of the opening and closing operation unit 12 is at a location other than the back side of the slide unit 13, the proceed proceeds to Step S204. In Step S210, the movement mode is set to the reset mode by the control information setting unit 20, and the process returns to Step S201.

The acquiring operation in Step S205 and the generating operation in Step S206 may be simultaneously performed, or may be performed in the reverse order.

Advantages of the Second Embodiment

As described above, by providing the rotating mechanism 24, it is possible to open and close the opening and closing operation unit 12 with the thumb 11a or the index finger 11b.

Modifications of the First Embodiment and the Second Embodiment

In the first embodiment, a ratchet structure in which the slide unit 3 is settable in steps in a front direction and is smoothly movable in a back direction may be provided.

The feedback of force in the first embodiment is performed by a structure in which the slave apparatus is provided with a force detecting unit and a gripping force detecting unit. However, it is possible to use, as a structure that does not include a force detecting unit and a gripping force detecting unit, a structure in which, on the basis of the position of the slave mechanism or the angle of the hand mechanism 4, the position is fed back to the master mechanism and the opening and closing operation unit.

Further, although, in the first embodiment, the operation information generating unit 53 is provided at the slave robot 2 and the control information setting unit 20 is provided at the master robot 3, these functions may be provided at either of the robots.

Although the master mechanism and the slave mechanism are six-axis mechanisms, they are not limited thereto.

Although the present disclosure is described on the basis of the first and second embodiments and the modifications, the present disclosure is obviously not limited to the first and second embodiments and the modifications. The following cases are also included in the present disclosure.

Specifically speaking, some or all of the controlling devices or controlling units are computer systems including, for example, a microprocessor, ROM, RAM, a hard disk unit, a display unit, a keyboard, or a mouse. A computer program is stored in RAM or the hard disk unit. When the microprocessor operates in accordance with the computer program, the function of each portion is realized. Here, in order to realize a predetermined function, the computer program includes a combination of a plurality of instruction codes indicating instructions issued to a computer.

For example, when a program executing unit, such as a CPU, reads out and executes a software program recorded in a recording medium, such as a hard disk or a semiconductor memory, it is possible for each structural element to perform its operation. A software that allows some or all of the elements of the controlling devices in the embodiments or the modifications to perform their operations is a program such as that described below. That is, this program is stored in a computer-readable non-transitory recording medium that includes a program for causing a computer to execute a method for controlling the master apparatus for the master slave apparatus and that is readable by a computer. The program includes the following steps, with the master apparatus controlling a slave apparatus. The steps are causing a hand operation mechanism to perform operating instructions for opening and closing a hand mechanism, the hand operation mechanism including a fixed unit, an opening and closing operation unit, and a slide unit, the hand mechanism including a pair of opening and closing members, the slide unit being attached so as to be capable of reciprocating with respect to the fixed unit, the opening and closing operation unit being connected to the slide unit, being capable of reciprocating with respect to the fixed unit, and being openable and closable with respect to the fixed unit, the hand mechanism being connected to a slave mechanism, the slave apparatus including the slave mechanism and the hand mechanism; causing the master mechanism to operate the slave mechanism; causing a master hand controlling device to control opening and closing of the pair of opening and closing members on the basis of an opening and closing amount of the opening and closing operation unit; and causing an output unit to output operation information to the slave mechanism on the basis of the opening and closing amount and a position of the opening and closing operation unit at the fixed unit, the operation information including an angle of the pair of opening and closing members.

This program may be executed by being downloaded from, for example, a server. Alternatively, this program may also be executed by reading out the program recorded in a predetermined recording medium (for example, an optical disk, such as a CD-ROM, a magnetic disk, or a semiconductor memory).

The number of computers for executing this program may be one or more than one. That is, centralized processing or distributed processing may be performed.

Of the above-described various embodiments and modifications, any of the embodiments and modifications may be combined as appropriate to provide the advantages provided thereby.

The master apparatus for the master slave apparatus, the method for controlling the master apparatus, and the master slave apparatus are useful in, for example, mounting a part (exemplary object) with respect to an insertion opening (exemplary target object) of a printed circuit board for a device, such as a television, a DVD recorder, or a cellular phone, in cell production in a plant.

CROSS REFERENCES TO RELATED APPLICATIONS

The application is based on Japanese Patent Application No. 2013-235305 filed on Nov. 13, 2013 and Japanese Patent Application No. 2014-148676 filed on Jul. 22, 2014, the entire contents of which are incorporated herein by reference.

What is claimed is:

1. A master apparatus for a master slave apparatus, the master apparatus controlling a slave apparatus, the master apparatus comprising:
a hand operation mechanism configured to be operated by a person for opening and closing a hand mechanism including a pair of opening and closing members, the hand mechanism being connected to a slave mechanism, the slave apparatus including the slave mechanism and the hand mechanism;
a master mechanism configured to operate the slave mechanism;
a master hand controlling device; and
an output unit,
wherein the hand operation mechanism includes a grip unit, an opening and closing operation unit, and a slide unit,
wherein the opening and closing operation unit is connected to the slide unit,
wherein the opening and closing operation unit is configured to be reciprocated with respect to the grip unit, and to be opened and closed with respect to the grip unit,
wherein the master hand controlling device controls opening and closing of the pair of opening and closing members on the basis of an opening and closing amount of the opening and closing operation unit,
wherein the output unit outputs operation information to the slave mechanism on the basis of the opening and closing amount and a position of the opening and closing operation unit at the grip unit, the operation information including an angle of the pair of opening and closing members,
wherein the slide unit is connected to the grip unit,
wherein the grip unit is connected to an end of the master mechanism,
wherein the slide unit includes a linear slide rail and an operating-unit supporting section,
wherein the linear slide rail is fixed to the grip unit along a longitudinal direction of the grip unit,
wherein the operating-unit supporting section engages with the linear slide rail and is configured to be manually slid along the linear slide rail, and
wherein the opening and closing operation unit is disposed at the operating-unit supporting section so as to be rotatable.

2. The master apparatus for the master slave apparatus according to claim 1, wherein the opening and closing operation unit is configured to be operated with a thumb or an index finger of the person, and
wherein, when the opening and closing operation unit is being operated, the grip unit is configured to be supported with a finger of the person other than the finger of the person that operates the opening and closing operation unit.

3. The master apparatus for the master slave apparatus according to claim 2, wherein the slide unit is connected to a side surface of the grip unit, and
wherein the master apparatus further comprises an opening-and-closing-operation-unit position acquiring unit and an opening-and-closing amount acquiring unit, the opening-and-closing-operation-unit position acquiring unit being configured to acquire a position of the opening and closing operation unit with respect to the grip unit at the master mechanism as the position of the opening and closing operation unit with respect to the slide unit, and the opening-and-closing amount acquiring unit being configured to acquire the opening and closing amount at the opening and closing operation unit.

4. The master apparatus for the master slave apparatus according to claim 2, wherein the slide unit is connected to the grip unit,
wherein the master apparatus further comprises an opening-and-closing-operation-unit position acquiring unit and an opening-and-closing amount acquiring unit,
wherein the opening-and-closing-operation-unit position acquiring unit is configured to acquire a position of the opening and closing operation unit with respect to the grip unit at the master mechanism as the position of the opening and closing operation unit with respect to the slide unit,
wherein the opening-and-closing amount acquiring unit is configured to acquire the opening and closing amount,
wherein the slave apparatus includes a force information acquiring unit and a gripping force information acquiring unit,
wherein the force information acquiring unit is configured to acquire force information about a force that is applied to the slave mechanism,
wherein the gripping force information acquiring unit is configured to acquire gripping force information about a gripping force generated when an object is gripped by opening and closing the hand mechanism,
wherein the master hand controlling device includes an operation information generating unit and a master hand controlling unit,
wherein the operation information generating unit is configured to provide generated gripping force information or generated force information for operation information in accordance with the position of the opening and closing operation unit with respect to the slide unit and the force information acquired by the force information acquiring unit or the gripping force information acquired by the gripping force information acquiring unit,
wherein the master hand controlling unit transmits, as the operation information, the generated force information or the generated gripping force information provided by the operation information generating unit to the master mechanism,
wherein the slave apparatus further includes a slave hand controlling unit, wherein the slave hand controlling unit is connected to the slave mechanism and the master hand controlling unit, and wherein the slave hand controlling unit outputs, as operation information that is transmitted to the slave mechanism, the operation information of the master mechanism that is transmitted from the master hand controlling unit.

5. The master apparatus for the master slave apparatus according to claim 4, wherein a member that is connected to the opening and closing operation unit is disposed so as to protrude in a direction that crosses the grip unit.

6. The master apparatus for the master slave apparatus according to claim 5, further comprising a control information setting unit configured to switch control modes between a reset mode and a movement mode, the reset mode being the control mode in which a control operation is temporarily stopped for resetting a position of the master mechanism or the position of the opening and closing operation unit with respect to the slide unit, the movement mode being the control mode in which the operation is performed by the hand mechanism, wherein, on the basis of the control mode that has been set by the control information setting unit, the master hand controlling device outputs operation information for controlling the slave mechanism.

7. The master apparatus for the master slave apparatus according to claim 4, wherein the operation information generating unit provides the generated force information or the generated gripping force information so as to increase in value as the position of the opening and closing operation unit with respect to the slide unit moves towards a back side with respect to the slide unit, and provides the generated force information or the generated gripping force information so as to decrease in value as the position of the opening and closing operation unit with respect to the slide unit moves towards a front side with respect to the slide unit.

8. The master apparatus for the master slave apparatus according to claim 6, further comprising a rotating mechanism that is connected to the slide unit and the opening and closing operation unit and that is rotatable with respect to the grip unit around the grip unit, wherein, by rotating the rotating mechanism with respect to the grip unit, a change is made between a position where the opening and closing operation unit is disposed at an upper side of the grip unit and a position where the opening and closing operation unit is disposed at a lower side of the grip unit.

9. The master apparatus for the master slave apparatus according to claim 8, further comprising a rotating mechanism position detecting unit configured to detect whether the opening and closing operation unit is disposed at the upper side of the grip unit or is disposed at the lower side of the grip unit, and to output a result of the detection to the operation information generating unit, wherein, when the movement mode for performing the operation at the hand mechanism is set by the control information setting unit and the rotating mechanism position detecting unit detects that the opening and closing operation unit is disposed at the lower side of the grip unit, the control information setting unit switches the control mode from the movement mode to the reset mode.

10. A master slave apparatus comprising:
a master apparatus and a slave apparatus,
wherein slave apparatus includes a hand mechanism and a slave mechanism, wherein the master apparatus includes:
a hand operation mechanism configured to be operated by a person for opening and closing the hand mechanism including a pair of opening and closing members, the hand mechanism being connected to the slave mechanism;
a master mechanism configured to operate the slave mechanism;
a master hand controlling device; and
an output unit,
wherein the hand operation mechanism includes a grip unit, an opening and closing operation unit, and a slide unit,
wherein the opening and closing operation unit is connected to the slide unit,
wherein the opening and closing operation unit is configured to be reciprocated with respect to the grip unit, and to be opened and closed with respect to the grip unit,
wherein the master hand controlling device controls opening and closing of the pair of opening and closing members on the basis of an opening and closing amount of the opening and closing operation unit,
wherein the output unit outputs operation information to the slave mechanism on the basis of the opening and closing amount and a position of the opening and closing operation unit at the grip unit, the operation information including an angle of the pair of opening and closing members,
wherein the slide unit is connected to the grip unit,
wherein the grip unit is connected to an end of the master mechanism,
wherein the slide unit includes a linear slide rail and an operating-unit supporting section,
wherein the linear slide rail is fixed to the grip unit along a longitudinal direction of the grip unit,
wherein the operating-unit supporting section engages with the linear slide rail and is configured to be manually slid along the linear slide rail, and
wherein the opening and closing operation unit is disposed at the operating-unit supporting section so as to be rotatable.

11. A method for controlling a master apparatus for a master slave apparatus, the master apparatus controlling a slave apparatus, and the master apparatus including a hand operation mechanism configured to be operated by a person for opening and closing a hand mechanism, wherein
the hand operation mechanism includes a grip unit, an opening and closing operation unit, and a slide unit,
the hand mechanism includes a pair of opening and closing members,
the opening and closing operation unit is connected to the slide unit,
the opening and closing operation unit is configured to be reciprocated with respect to the grip unit, and to be opened and closed with respect to the grip unit,
the hand mechanism is connected to a slave mechanism, the slave apparatus including the slave mechanism and the hand mechanism,
the slide unit is connected to the grip unit,
the slide unit includes a linear slide rail and an operating-unit supporting section,
the linear slide rail is fixed to the grip unit along a longitudinal direction of the grip unit,
the operating-unit supporting section engages with the linear slide rail and is configured to be manually slid along the linear slide rail, and the opening and closing operation unit is disposed at the operating-unit supporting section so as to be rotatable, the method comprising the steps of:

operating the slave mechanism using a master mechanism, wherein the grip unit is connected to an end of the master mechanism;

controlling, using a master hand controlling device, opening and closing of the pair of opening and closing members on the basis of an opening and closing amount of the opening and closing operation unit; and outputting operation information, using an output unit, to the slave mechanism on the basis of the opening and closing amount and a position of the opening and closing operation unit at the grip unit, the operation information including an angle of the pair of opening and closing members.

\* \* \* \* \*